(12) United States Patent
Nassar et al.

(10) Patent No.: US 12,067,275 B1
(45) Date of Patent: Aug. 20, 2024

(54) MEMORY BANK WITH SUBDOMAINS

(71) Applicant: Apple Inc., Cupertino, CA (US)

(72) Inventors: Samer Nassar, Haifa (IL); Sagi Lahav, Kiriat-Bialik (IL); Lital Levy-Rubin, Tel Aviv (IL); Roey Grinvald, Kfar-Yona (IL)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 17/810,275

(22) Filed: Jun. 30, 2022

(51) Int. Cl.
*G06F 3/06* (2006.01)

(52) U.S. Cl.
CPC .......... *G06F 3/0644* (2013.01); *G06F 3/0604* (2013.01); *G06F 3/061* (2013.01); *G06F 3/0676* (2013.01); *G06F 3/0679* (2013.01)

(58) Field of Classification Search
CPC ...... G06F 3/0644; G06F 3/0604; G06F 3/061; G06F 3/0676; G06F 3/0679; G06F 3/0601; G06F 3/0631; G06F 3/0659; G06F 2213/0026; G06F 12/0292; G06F 12/063; G06F 12/1081; G06F 12/0686; G06F 12/0815; G06F 12/109; G06F 2009/45579; G06F 13/385; G06F 13/1668; G06F 13/0026; G06F 13/14; G06F 13/1673; G06F 13/1642; G06F 2212/621
See application file for complete search history.

(56) References Cited

U.S. PATENT DOCUMENTS

| | | | |
|---|---|---|---|
| 7,430,649 B2 | 9/2008 | Nakashima et al. | |
| 8,631,212 B2 | 1/2014 | Kegel et al. | |
| 9,934,065 B1 | 4/2018 | Johnson | |
| 2018/0101494 A1* | 4/2018 | Davis | G06F 13/105 |
| 2018/0253377 A1* | 9/2018 | Liang | G06F 21/85 |
| 2022/0229773 A1* | 7/2022 | Govindarajan | G06F 12/0292 |
| 2022/0309021 A1* | 9/2022 | Jeon | G06F 13/1673 |

OTHER PUBLICATIONS

Yu Zou, et al., DirectNVM: Hardware-accelerated NVMe SSDs for High-performance Embedded Computing, Publication date: Feb. 2022, 24 pages, ACM Transactions on Embedded Computing Systems, vol. 21, No. 1, Article 9.

* cited by examiner

*Primary Examiner* — Curtis James Kortman
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to an I/O agent circuit. The I/O agent circuit may include a memory bank and be coupled to a set of devices. The I/O agent circuit may assign a device of the set of devices to a subdomain of a plurality of subdomains implemented for the memory bank. The I/O agent circuit may store, in that memory bank, a set of transactions of the device in association with the subdomain assigned to the device. The I/O agent circuit may execute the set of transactions such that transactions stored in the memory bank in association with other ones of the plurality of subdomains than the subdomain assigned to the device do not block execution of the set of transactions.

23 Claims, 15 Drawing Sheets

MEMORY BANK WITH SUBDOMAINS

BACKGROUND

Technical Field

This disclosure pertains generally to an integrated circuit and, more specifically, to an input/output (I/O) agent circuit that implements a memory bank with subdomains.

Description of the Related Art

Modern computer systems often include a system on a chip (SOC) that integrates many computer components (e.g., a central processing unit (CPU), a graphics processing unit (GPU), etc.) onto an integrated circuit die. These components are normally coupled to memory devices (e.g., random access memory) of the systems via a memory controller. During operation, those components typically perform read and write transactions that involve accessing those memory devices. For read transactions, the components retrieve data from the memory devices without manipulating the data, but for write transactions, the components manipulate the data and then ultimately write it back to one of the memory devices.

SUMMARY

Various embodiments relating to an I/O agent circuit that is configured to implement a memory bank with subdomains is disclosed. Generally speaking, an SOC is coupled to memory that stores data and is further coupled to (or includes) peripheral components, such as a display, that operate on data of that memory. An I/O agent is disclosed that is included in the SOC and includes a memory bank capable of storing transactions that are received from one or more of the peripheral components. The I/O agent may assign a peripheral component to a subdomain that is implemented for the memory bank. In response to receiving a request from the peripheral component to perform a transaction, the I/O agent stores, in the memory bank, that transaction in association with the subdomain assigned to the peripheral component. The I/O agent may execute that transaction such that other transactions stored in the memory bank in association with other subdomains do not block execution of the transaction.

DETAILED DESCRIPTION

Figure 1:
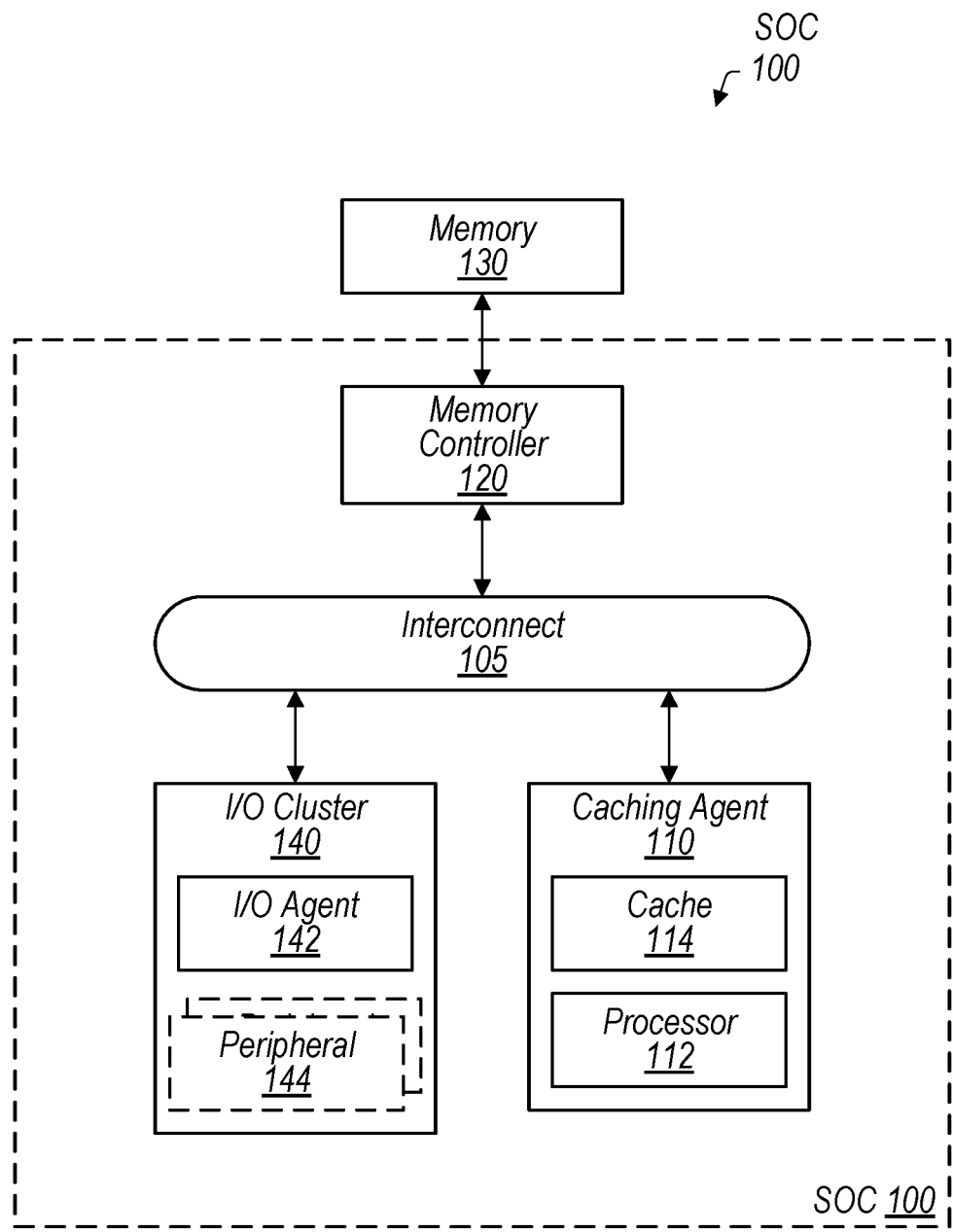
FIG. 1 is a block diagram illustrating example elements of an SOC having an I/O agent circuit, according to some embodiments.

This disclosure describes embodiments relating to an I/O agent circuit (or more briefly, an I/O agent) that is configured to serve as a bridge between peripheral devices (or, peripherals) and memory accessible to the peripherals. As part of bridging those components, the I/O agent can receive requests from those peripherals to perform read and write transactions with respect to the memory. In order to perform the transactions, the I/O agent stores information about the transactions locally (e.g., their state, their write data if write transactions, etc.). In conventional approaches, an I/O agent includes multiple memory banks (e.g., each with 128 entries) that are used to store the transactional information for the peripherals that are coupled to the I/O agent. For example, an I/O agent may be coupled to two Peripheral Component Interconnect Express (PCIe) controllers each with eight data lanes-referred to as "PCIe x8." The transactions of a peripheral behind one of those PCIe x8 controllers are stored in a first memory bank while the transactions of a peripheral behind the other PCIe x8 are stored in a second, separate memory bank. A PCIe controller, however, can support more data lanes than eight (e.g., PCIe x16, which supports sixteen lanes). A peripheral behind a larger PCIe controller often issues more transaction requests to take advantage of the increased bandwidth provided by those additional data lanes. But the memory bank used by the I/O agent in the conventional approach does not provide enough storage for the transactional information associated with a peripheral that takes advantage of a higher bandwidth. Increasing the size of the various, separate memory banks has many disadvantages that include higher die space cost and increased power consumption. This present disclosure addresses, among other things, the technical problem of how to provide sufficient bandwidth in an I/O agent to support peripherals that consume higher bandwidths without the disadvantages of simply increasing the size of the separate memory banks in the I/O agent.

In various embodiments described below, an I/O agent includes a single memory bank instead of the multiple separate memory banks discussed above and is configured to store, for a set of peripherals, transactional information in the memory bank in association with subdomains that are implemented for that memory bank. In particular, an SOC can include a memory, one or more memory controllers, and an I/O agent coupled to one or more peripherals. The I/O agent is configured to receive requests from those peripherals to perform transactions, store the transactions (that is, transactional information) in a memory bank of the I/O agent, and release those transactions to a pipeline of the I/O agent. In various embodiments, that memory bank replaces two or more separate memory banks that were previously implemented and used in the I/O agent for storing the transactions. For example, the disclosed memory bank might include 512 entries while the separate memory banks of prior implementations each included 128 entries. In many cases, the transactions that originate from a source (e.g., peripherals behind a PCIe controller) are ordered according to a set of ordering rules. Since transactions stored in the memory bank may be received from different sources and it may be desirable to order those transactions according to the ordering rules that are associated with their source, in various embodiments, the I/O agent is configured to store a transaction in the memory bank in association with a subdomain. Transactions within a subdomain may be ordered independently of the transactions of another subdomain while all those transactions are stored in the same memory bank.

Accordingly, in various embodiments, the I/O agent is configured to assign a peripheral to a subdomain of the memory bank. In response to receiving requests to performs transactions for that peripheral, the I/O agent can store those transactions in the memory bank in association with the subdomain assigned to the peripheral. The I/O agent can execute the transactions such that transactions stored in the memory bank in association with other subdomains do not block execution of the peripheral's transactions. In various embodiments, the number of subdomains implemented for the memory bank depends on the sources coupled to the I/O agent. As a result, in an SOC that includes multiple I/O agents, each of those I/O agents may support a different number of subdomains. For example, an I/O agent coupled to a peripheral that uses a PCIe 16x interface may implement a single subdomain within its memory bank while an I/O agent coupled to two peripherals that each use a PCIe 8x interface may implement two subdomain within its memory bank.

These techniques may be advantageous over prior implementations as they permit an I/O agent to support peripherals that consume higher bandwidths without incurring the higher die space cost or increased power consumption associated with increasing the size of separate memory banks. In particular, those separate memory banks may be "merged" into one memory bank that comprises less overall circuitry involved its operation but includes sufficient storage to support a peripheral that consumes higher a bandwidth (e.g., a device that utilizes PCIe x16). The use of subdomains allows for that memory bank to also support multiple peripherals that consume lower bandwidths (e.g., devices that utilize PCIe x8) at the same time. Furthermore, as discussed below, die space may be saved in a memory controller coupled to an I/O agent as the memory controller may consider the single memory bank as a single caching agent instead of multiple caching agents in the above-mentioned implementation with the separate memory banks. An example application of the techniques will now be discussed, starting with reference to FIG. 1.

Turning now to FIG. 1, a block diagram of an example system on a chip (SOC) 100 is depicted. As implied by the name, the various components of SOC 100 are integrated onto a single semiconductor substrate as an integrated circuit "chip." But in some embodiments, the components are implemented on two or more discrete chips within a computing system. In the illustrated embodiment, SOC 100 includes a caching agent 110, a memory controller 120 that is coupled to a memory 130, and an input/output (I/O) cluster 140. Components 110, 120, and 140 are coupled together via an interconnect 105. As further shown, caching agent 110 includes a processor 112 and a cache 114, and I/O cluster 140 includes an I/O agent 142 and peripherals 144. A peripheral 144 may be internal to SOC 100 or external to SOC 100 but coupled to I/O agent 142 via an interface (e.g., a PCIe x16 connection). In various embodiments, SOC 100 is implemented differently than shown. For example, SOC 100 may include a display controller, a power management circuit, etc. and memory 130 may be included on SOC 100. As another example, SOC 100 may include multiple I/O clusters 140, and I/O agent 142 may be coupled to a single peripheral 144. Accordingly, it is noted that the number of components of SOC 100 (and also the number of subcomponents) may vary between embodiments. As such, there may be more or fewer of each component/subcomponent than the number shown in FIG. 1.

A caching agent 110, in various embodiments, is circuitry having a cache for caching memory data or that may otherwise take control of cache lines and potentially update the data of those cache lines locally. Caching agents 110 may participate in a cache coherency protocol that ensure that updates to data made by one caching agent 110 are visible to the other caching agents 110 that subsequently read that data, and that updates made in a particular order by two or more caching agents 110 (as determined at an ordering point in SOC 100, such as memory controller 120) are observed in that order by all caching agents 110. Caching agents 110 can include, for example, processing units (e.g., CPUs, GPUs, etc.), fixed function circuitry, and fixed function circuitry having processor assist via an embedded processor or processors. Since I/O agent 142 includes a memory bank that serves as a cache, I/O agent 142 can be considered a type of caching agent 110 and thus participate in the cache coherency protocol. But I/O agent 142 is different from other caching agents 110 for at least the reason that I/O agent 142 serves as a cache-capable entity configured to cache data for other, separate entities (e.g., peripherals 144, such as a display device, a USB-connected device, etc.) that do not have their own caches. I/O agent 142 may also cache a relatively small number of cache lines temporarily to improve peripheral memory access latency but may proactively retire cache lines once transactions are complete.

In the illustrated embodiment, caching agent 110 is a processing unit having a processor 112 that may serve as the CPU of SOC 100. Processor 112, in various embodiments, includes any circuitry and/or microcode configured to execute instructions defined in an instruction set architecture that is implemented by that processor 112. Processor 112 may encompass one or more processor cores that are implemented on an integrated circuit with other components of SOC 100. Those individual processor cores of processor 112 may share a common last level cache (e.g., an L2 cache) while including their own respective caches (e.g., an L0 cache and/or an L1 cache) for storing data and program instructions. Processor 112 may execute the main control software of the system, such as an operating system. Generally, software executed by the CPU controls the other components of the system to realize the desired functionality of the system. Processor 112 may further execute other software, such as application programs, and therefore can be referred to as an application processor. Caching agent 110 may further include hardware configured to interface caching agent 110 to the other components of SOC 100 (e.g., an interface to interconnect 105).

Cache 114, in various embodiments, is a storage array that includes entries configured to store data or program instructions. As such, cache 114 may be a data cache, an instruction cache, or a shared instruction/data cache. Cache 114 may be an associative storage array (e.g., fully associative or set-associative, such as a 4-way set associative cache) or a direct-mapped storage array and may have any desired storage capacity. In various embodiments, cache lines (or "cache blocks") are the unit of allocation and deallocation within cache 114 and may be of any desired size (e.g., 32 bytes, 64 bytes, 128 bytes, etc.). During operation of caching agent 110, information may be pulled from other components of the system into cache 114 and used by the processor cores of processor 112. For example, as a processor core proceeds through an execution path, the processor core may cause program instructions to be fetched from memory 130 into cache 114 and then it may fetch them from cache 114 and execute them. Also, during the operation of caching agent 110, data may be written from cache 114 to memory 130 through memory controller 120.

Memory controller 120, in various embodiments, includes circuitry that is configured to receive, from the other components of SOC 100, memory requests (e.g., load/store requests, instruction fetch requests, etc.) to perform memory operations, such as accessing and returning data from memory 130. Memory controller 120 may be further configured to access any type of memory 130. Memory 130 may be implemented using various, different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), etc. Memory available to SOC 100, however, is not limited to primary storage, such as memory 130. Rather, SOC 100 may further include other forms of storage such as cache memory (e.g., L1 cache, L2 cache, etc.) that may be found in caching agent 110 or I/O agent 142. In various embodiments, memory controller 120 include queues for storing and ordering memory operations that are to be sent to memory 130. Memory controller 120 may include data buffers to store write data awaiting to be written to memory 130 and read data awaiting to be returned to the source of a memory operation (e.g., caching agent 110). In some embodiments, there may be more than one memory controller 120 coupled to separate instances of memory 130.

In various embodiments, memory controller 120 includes components for maintaining cache coherency within SOC 100, including components that track the location of data of cache lines within SOC 100. Accordingly, in various embodiments, requests for cache line data can be routed through memory controller 120, which may access the data from other caching agents 110 and/or memory 130. In addition to accessing the data, memory controller 120 may cause snoop requests to be issued to caching agents 110 and I/O agents 142 that store the data within their local cache. As a result, memory controller 120 can cause those caching agents 110 and I/O agents 142 to invalidate and/or evict the data from their caches to ensure coherency within the system. Accordingly, in some embodiments, memory controller 120 may process exclusive cache line ownership requests in which memory controller 120 grants a component exclusive ownership of a cache line while using snoop requests to ensure that the data is not cached in other caching agents 110 and I/O agents 142. As mentioned, I/O agent 142 includes a memory bank that replaces multiple, separate memory banks that were previously included in I/O agent 142. In various embodiments, memory controller 120 considers that memory bank as a single caching point with respect to the implemented cache coherency protocol. Because the memory bank replaces multiple, separate memory banks that were considered separate caching points, memory controller 120 may store less tracking information since there are fewer caching points in I/O agent 142. As a result, die space may be saved when implementing memory controller 120.

I/O cluster 140, in various embodiments, includes I/O agent 142 and a set of peripherals 144 that may provide additional hardware functionality. Peripherals 144 can include, but are not limited to, video peripherals (e.g., GPUs, blenders, display controllers, scalers, etc.) and audio peripherals (e.g., microphones, speakers, interfaces to microphones and speakers, digital signal processors, audio processors, mixers, etc.). Peripherals 144 can further include interface controllers for interfaces that are external to SOC 100 (e.g., Universal Serial Bus (USB), PCI, PCIe, serial and parallel ports, etc.) and networking peripherals (e.g., media access controllers (MACs)). While not shown, in various embodiments, SOC 100 includes multiple I/O clusters 140 having respective sets of peripherals 144. For example, SOC 100 might include a first I/O cluster 140 for external display peripherals 144, a second I/O cluster 140 for USB peripherals 144, and a third I/O cluster 140 for video encoder peripherals 144. Each of the I/O clusters 140 may include its own I/O agent 142.

I/O agent 142, in various embodiments, includes circuitry that is configured to bridge its peripherals 144 to interconnect 105 and to implement coherency mechanisms for processing transactions associated with those peripherals 144. I/O agent 142 receives transaction requests from peripheral 144 to read and/or write data associated with memory 130. Transactions (that is, transactional information associated with the requests) may be stored in a table of requests (TOR) memory bank and released from that TOR memory bank to a pipeline of I/O agent 142 based on one or more conditions being satisfied. As discussed in greater detail with respect to FIGS. 4-5B, I/O agent 142 may store transactions in the TOR memory bank in association with different subdomains such that the transactions of one subdomain do not block the execution of transactions of another subdomain. The pipeline processes received transactions and may also reject one or more of the transactions based on one or more conditions being satisfied. As part of processing a transaction, in various embodiments, I/O agent 142 can communicate with memory controller 120 to obtain exclusive ownership over the data targeted by the transaction. As such, memory controller 120 may grant exclusive ownership to I/O agent 142, which may involve providing I/O agent 142 with cache line data and sending snoop requests to the other caching agents 110 and I/O agents 142. After obtaining exclusive ownership of the cache line data, I/O agent 142 may begin completing those transactions that target the cache line data. In response to completing a transaction, I/O agent 142 may provide an acknowledgement to the requesting peripheral 144 that the transaction has been completed. In some embodiments, I/O agent 142 does not obtain exclusive ownership for relaxed ordered requests, which do not have to be completed in a specified order.

Interconnect 105, in various embodiments, is any communication-based interconnect and/or protocol for communicating among components of SOC 100. For example, interconnect 105 may enable processor 112 within caching agent 110 to interact with peripheral 144 within I/O cluster 140. In various embodiments, interconnect 105 is bus-based, including shared bus configurations, cross bar configurations, and hierarchical buses with bridges. Interconnect 105 may be packet-based, and may be hierarchical with bridges, cross bar, point-to-point, or other interconnects. Example embodiments of SOC 100, including interconnects, are discussed in detail with respect to FIGS. 9-13.

Figure 2:
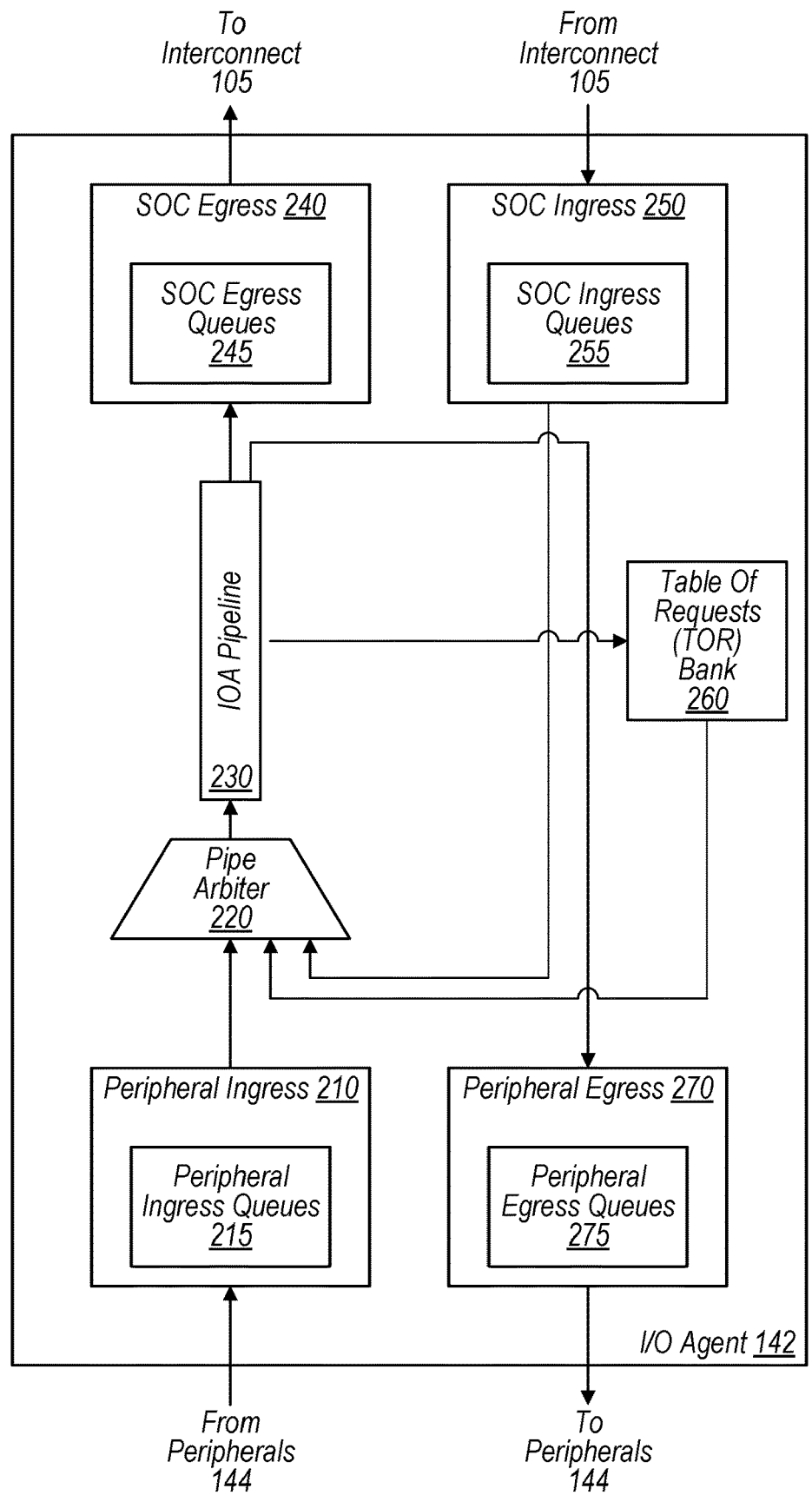
FIG. 2 is a block diagram illustrating example elements of an I/O agent circuit having a table of requests (TOR) memory bank, according to some embodiments.

Turning now to FIG. 2, a block diagram of example elements of I/O agent 142 is shown. Within the illustrated embodiment, I/O agent 142 includes a peripheral ingress circuit 210 (or simply, peripheral ingress 210), a pipe arbiter 220, an I/O agent (IOA) pipeline 230, an SOC egress circuit 240 (or simply, SOC egress 240), an SOC ingress circuit 250 (or simply, SOC ingress 250), a table of requests (TOR) bank 260, and a peripheral egress circuit 270 (or simply, peripheral egress 270). As further shown, peripheral ingress 210 includes ingress queues 215, SOC egress 240 includes SOC egress queues 245, SOC ingress 250 includes SOC ingress queues 255, and peripheral egress 270 includes peripheral egress queues 275. As shown, pipe arbiter 220 is coupled to peripheral ingress 210, SOC ingress 250, TOR bank 260, and IOA pipeline 230, and IOA pipeline 230 is coupled to SOC egress 240 and peripheral egress 270. In some embodiments, I/O agent 142 is implemented differently than shown. For example, I/O agent 142 may include a memory bank for merging write data with fetched data to produce merged data that can be written back to memory 130.

Peripheral ingress 210, in various embodiments, is circuitry coupled to peripherals 144 and configured to receive transactions requests from peripherals 144 to read and write data on their behalf. Consequently, peripheral ingress 210 may receive read transaction requests, write transaction requests, or combination of read and write transaction requests from a peripheral 144. A transaction request, in various embodiments, is a message that initiates a transaction, and specifies a memory address and a size of the data be read or written. For a write transaction, a transaction request may further specify data to be written to the cache line. Peripheral ingress 210 may store the transactional information (e.g., information that identifies the targeted cache line, the data to be written if applicable, etc.) from a transaction request in a peripheral ingress queue 215 as a transaction. Peripheral ingress 210 may submit transactions from its peripheral ingress queues 215 to pipe arbiter 220.

Peripheral ingress queues 215, in various embodiments, are circuitry that is configured to store transactional information derived from transaction requests received from peripherals 144. Peripheral ingress queues 215 may each comprise a linked list structure that implements a first-in, first-out protocol that preserves an ordering of transactions within a queue. In some embodiments, there are one or more peripheral ingress queues 215 that each comprise multiple linked list structures that store transactions. In various embodiments, a linked list structure of a peripheral ingress queue 215 is used to store transactions belonging to one or more specific transactional types. The transactional types may include, for example, posted relaxed ordered, posted non-relaxed ordered, non-posted relaxed ordered DRAM, and non-posted non-relaxed ordered DRAM. Consequently, for example, a first linked list structure may be used to store posted relaxed ordered and posted non-relaxed ordered transactions while a second linked list structure is used for storing non-posted relaxed ordered DRAM and non-posted non-relaxed ordered DRAM transactions. In some instances, since a linked list structure may store relaxed and non-relaxed ordered transactions, the relaxed ordered transactions may not bypass the non-relaxed ordered transactions inside a peripheral ingress queue 215.

In various embodiments, I/O agent 142 supports different virtual channels for servicing transactions. I/O agent 142 may support a low latency virtual channel for transactions that have low processing latencies and a bulk virtual channel for transactions that are directed at the same cache line/block, although potentially different portions of the cache line. Accordingly, in some embodiments, a peripheral ingress queue 215 may correspond to a specific virtual channel and thus be used to store corresponding transactions. For example, a peripheral ingress queue 215 may be used to store transactions classified as bulk non-posted relaxed ordered while another peripheral ingress queue 215 is used to store transactions classified as low latency non-posted relaxed ordered. In some embodiments, the linked list structures correspond to different virtual channels and therefore a peripheral ingress queue 215 with multiple linked list structures can correspond to different virtual channels.

Pipe arbiter 220, in various embodiments, is circuitry configured to select a transaction from a set of transactions provided to pipe arbiter 220 and issue the selected transaction to IOA pipeline 230. The selected transaction is referred to herein as the winning transaction as it has won the arbitration. As shown, pipe arbiter 220 can receive transactions from peripheral ingress 210, SOC ingress 250, and TOR bank 260. In some embodiments, the winning transaction is selected based on a credit scheme in which credits are used by peripheral ingress 210, SOC ingress 250, and TOR bank 260 to win arbitration. A spent credit is returned to the spender in response to the associated transaction completing a pass through IOA pipeline 230. In some embodiments, peripheral ingress 210, SOC ingress 250, and TOR bank 260 are assigned traffic priority levels. As such, when receiving transactions from those sources, pipe arbiter 220 may select a transaction from the source with the highest priority. Accordingly, traffic from a source may not be sent to IOA pipeline 230 if traffic from a higher priority source is also available at pipe arbiter 220 in the same clock cycle.

IOA pipeline 230, in various embodiments, is circuitry that comprises multiple pipeline stages in which a transaction is processed. A transaction may be issued multiple times to IOA pipeline 230 such that the transaction makes multiple passes through the pipeline. On the first pipeline pass, the transaction may be allocated such that it is added to TOR bank 260, including its write data if it is a write transaction. In various cases, a request is sent to memory controller 120 for data that is targeted by the transaction as part of the first pipeline pass. After receiving a data fill response from memory controller 120, the transaction may be issued again to IOA pipeline 230 for a second pipeline pass in which the data is acted upon, the transaction is retired, and a completion message is issued to the original requester (e.g., a peripheral 144) if the request is non-posted. In some cases, a transaction may make more than two pipeline passes through IOA pipeline 230.

SOC egress 240, in various embodiments, is circuitry coupled to interconnect 105 and configured to receive commands from IOA pipeline 230 and issue requests to components of SOC 100 (e.g., memory controller 120) based on the commands. Similar to peripheral ingress 210, SOC egress 240 includes SOC egress queues 245 that are configured to store transactional information for the different types of transactions. Consequently, SOC egress queues 245 may comprise linked list structures that implement the first-in, first-out protocol that preserves the ordering of transactions within the same queue, like those of peripheral ingress queues 215. As mentioned, I/O agent 142 may issue requests to memory controller 120 to write data or request data from memory 130 or another component (e.g., caching agent 110) within SOC 100. When a decision is made at IOA pipeline 230 to issue such a request, IOA pipeline 230 communicates with SOC egress 240 to enqueue the request within an SOC egress queue 245. If the request is a write request, then the data of the write request may be stored at SOC egress 240. Based on SOC egress queues 245, in various embodiments, SOC egress 240 issues requests (e.g., a write request) to components of SOC 100 via interconnect 105. If the request is a write request, then the data of the write request may be sent with the write request.

SOC ingress 250, in various embodiments, is circuitry coupled to interconnect 105 and configured to receive transaction requests and responses from components of SOC 100—those responses corresponding to requests previously sent by SOC egress 240. Similar to peripheral ingress 210 and SOC egress 240, SOC ingress 250 includes SOC ingress queues 255 that are configured to store transactional information for different types of transactions. SOC ingress queues 255 may comprise linked list structures, like those of peripheral ingress queues 215 and SOC egress queues 245. After receiving a transaction request and enqueuing a transaction in a SOC ingress queue 255, in various embodiments, SOC ingress 250 may issue that transaction to IOA pipeline 230. For example, SOC ingress 250 might receive a snoop request and submit a corresponding snoop transaction to IOA pipeline 230. A "snoop" or "snoop request," as used herein, refers to a message that is transmitted to a component (e.g., I/O agent 142) to request a state change for a cache line (e.g., to invalidate data of the cache line stored within a cache of the component) and, if that component has an exclusive copy of the cache line or is otherwise responsible for the cache line, the message may also request that the data of that cache line be provided by the component. After receiving a response to a request previously issued by SOC egress 240, in various embodiments, SOC ingress 250 makes available the data of the response (if any) to components of I/O agent 142. For example, SOC ingress 250 may store the data in a cache and update TOR bank 260 to indicate that the associated transaction may be released to IOA pipeline 230 to use that data. If the response includes a completion acknowledgement, then in various embodiments, SOC ingress 250 forwards that acknowledgement to peripheral egress 270.

Table of Requests (TOR) bank 260, in various embodiments, is circuitry configured to store outstanding transactions, monitor the conditions for resending those transactions to IOA pipeline 230, and then send the transactions to pipe arbiter 220 based on those conditions being satisfied. As mentioned, when a transaction makes a first pass through IOA pipeline 230 after being issued from either peripheral ingress 210 or SOC ingress 250, the transaction is allocated at TOR bank 260, which may include being stored in a TOR entry and/or in an ingress queue of TOR bank 260. As discussed in greater detail with respect to FIGS. 3-4, TOR 260 maintains various pieces of transactional information that enable it to assess when to release a transaction to IOA pipeline 230. In some embodiments, on a pipeline pass, IOA pipeline 230 identifies if an additional pipeline pass is needed to complete a transaction. If an additional pipeline pass is needed, IOA pipeline 230 may enqueue the transaction into a TOR ingress queue and update the TOR entry with the conditions that make the transaction eligible to be sent to pipe arbiter 220. Once those conditions are satisfied, TOR 260 may issue the corresponding transaction to pipe arbiter 220 for another pipeline pass through IOA pipeline 230.

Peripheral egress 270, in various embodiments, is circuitry coupled to peripherals 144 and configured to provide responses to peripherals 144 for requests that were previously sent by peripherals 144. Similar to peripheral ingress 210, peripheral egress 270 includes peripheral egress queues 275 that are configured to store transactional information for different types of transactions. Peripheral egress queues 275 may also comprise linked list structures, like those of peripheral ingress queues 215. As part of a final pipeline pass for a transaction, IOA pipeline 230 may store, in peripheral egress queues 275, the completion acknowledgements received at SOC ingress 250 along with any data if applicable. In some cases, SOC ingress 250 forwards the completion acknowledgements and data to peripheral egress 270. In various embodiments, after a transaction reaches the head of its queue in peripheral egress 270, peripheral egress 270 provides the completion acknowledgment and data (if applicable) to the appropriate peripheral 144.

Figure 3:
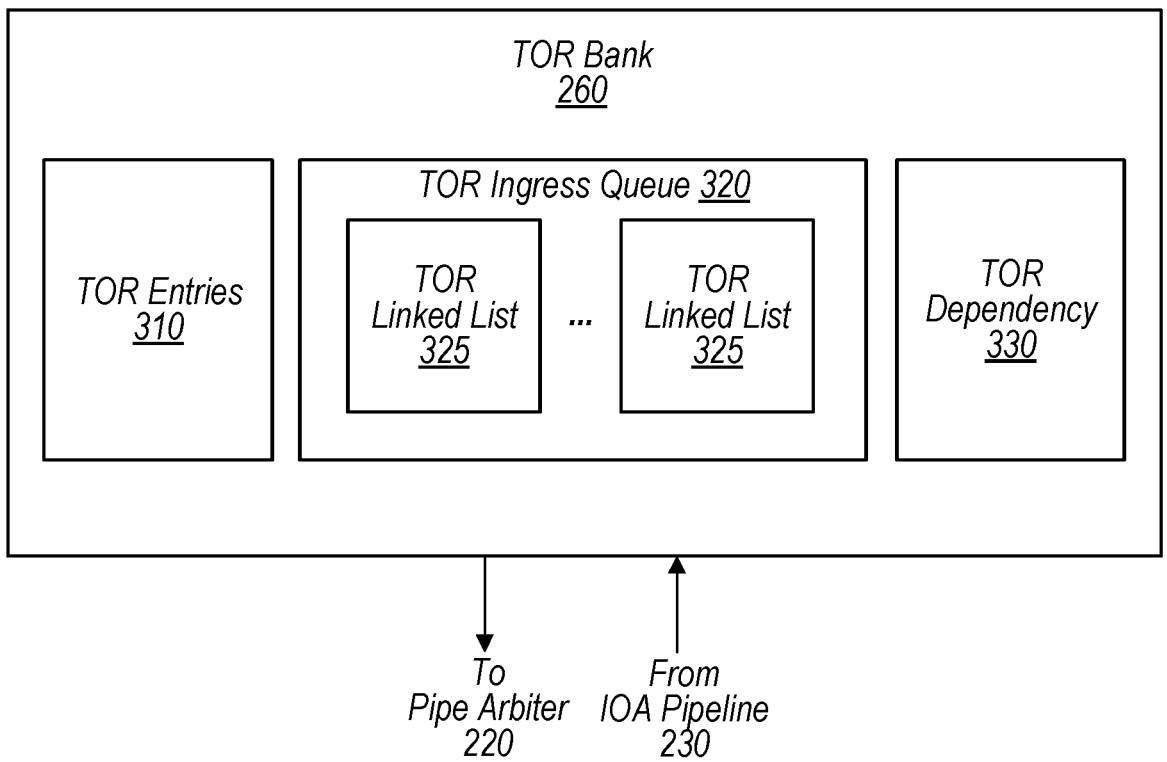
FIG. 3 is a block diagram illustrating example elements of a TOR memory bank having TOR entries and a TOR linked lists, according to some embodiments.

Turning now to FIG. 3, a block diagram of example elements of TOR 260 is shown. In the illustrated embodiment, TOR 260 includes TOR entries 310, a TOR ingress queue 320, and a TOR dependency block 330. Also as shown, TOR ingress queue 320 comprises a set of TOR linked lists 325. In some embodiments, TOR 260 is implemented differently than shown. For example, TOR 260 may include multiple TOR ingress queues 320 with respective TOR linked lists 235, an address block configured to store addresses of outstanding transactions, which can be used in address comparisons that are performed at a match stage of IOA pipeline 230, and/or a state block configured to store state information about outstanding transactions.

TOR entries 310, in various embodiments, is circuitry configured to store transactional information about outstanding transactions in I/O agent 142. As explained, a transaction may make multiple pipeline passes through IOA pipeline 230. On the first pipeline pass, in various embodiments, the transaction is decoded at a decode stage into a set of attributes that are stored within a TOR entry 310. On subsequent pipeline passes, the attributes are accessed from TOR 260 and used by IOA pipeline 230 to facilitate the execution of the corresponding transaction. As discussed in greater detail with respect to FIG. 4, the attributes of a transaction may include a command, a transaction type, a virtual channel, a subdomain, a source, and a destination. The use of the subdomain attribute may permit transactions originating from different interfaces to coexist in the same memory bank (e.g., when TOR 260 utilizes a single memory bank instead of multiple memory banks).

TOR ingress queue 320, in various embodiments, is circuitry that is configured to store indications of the outstanding transactions that require subsequent passes through IOA pipeline 230. Similar to peripheral ingress queues 215 of peripheral ingress 210, TOR ingress queue 320 is configured to store transactional information for the different types of transactions. TOR ingress queue 320 comprises linked lists 325 that may implement the first-in, first-out protocol that preserves the ordering of transactions allocated in the same queue, like those of peripheral ingress queues 215. IOA pipeline 230 may determine that a transaction should make another pipeline pass and thus may enqueue the transaction in TOR ingress queue 320. IOA pipeline 230 may also provide information that identifies the conditions for releasing that transaction. As a result, TOR 260, in various embodiments, monitors for external and internal trigger events that cause the transaction to be eligible for arbitration. If that transaction is deemed eligible, then TOR 260 may send the transaction to arbiter 220 in FIFO order per the transaction's TOR linked list 325. In many cases, a transaction becomes eligible when it is the senior transaction for its TOR linked list 325.

In particular, the ordering rules may be such that transactions have to wait for preceding transactions of the same type and of different types to complete before the waiting transactions are released to IOA pipeline 230 without causing coherency issues. In various embodiments, transactions of the same type and subdomain are stored in the same TOR linked list 325. That TOR linked list 325 may enforce an ordering upon transactions such that an older transaction is released prior to a younger transaction. Consequently, a TOR linked list 325 can ensure that a transaction waits for older transactions of its own type to complete before it completes. TOR dependency 330, in various embodiments, is circuitry configured to maintain the ordering rules between transactions. Consequently, TOR dependency 330 may determine when a transaction can be released from TOR 260 to IOA pipeline 230 and may utilize TOR counters to generate that determination. When a transaction is allocated, TOR dependency 330 may increment a set of counters based on the type of that transaction and may store, for the transaction, pointers to those counters. When the transaction is completed, TOR dependency 330 may decrement the counters indicated by the pointers stored for that transaction. When a TOR counter reaches its initial value, TOR dependency 330 may determine that the preceding transaction(s) blocking a particular transaction have been completed and thus the particular transaction can be issued to pipe arbiter 220.

Figure 4:
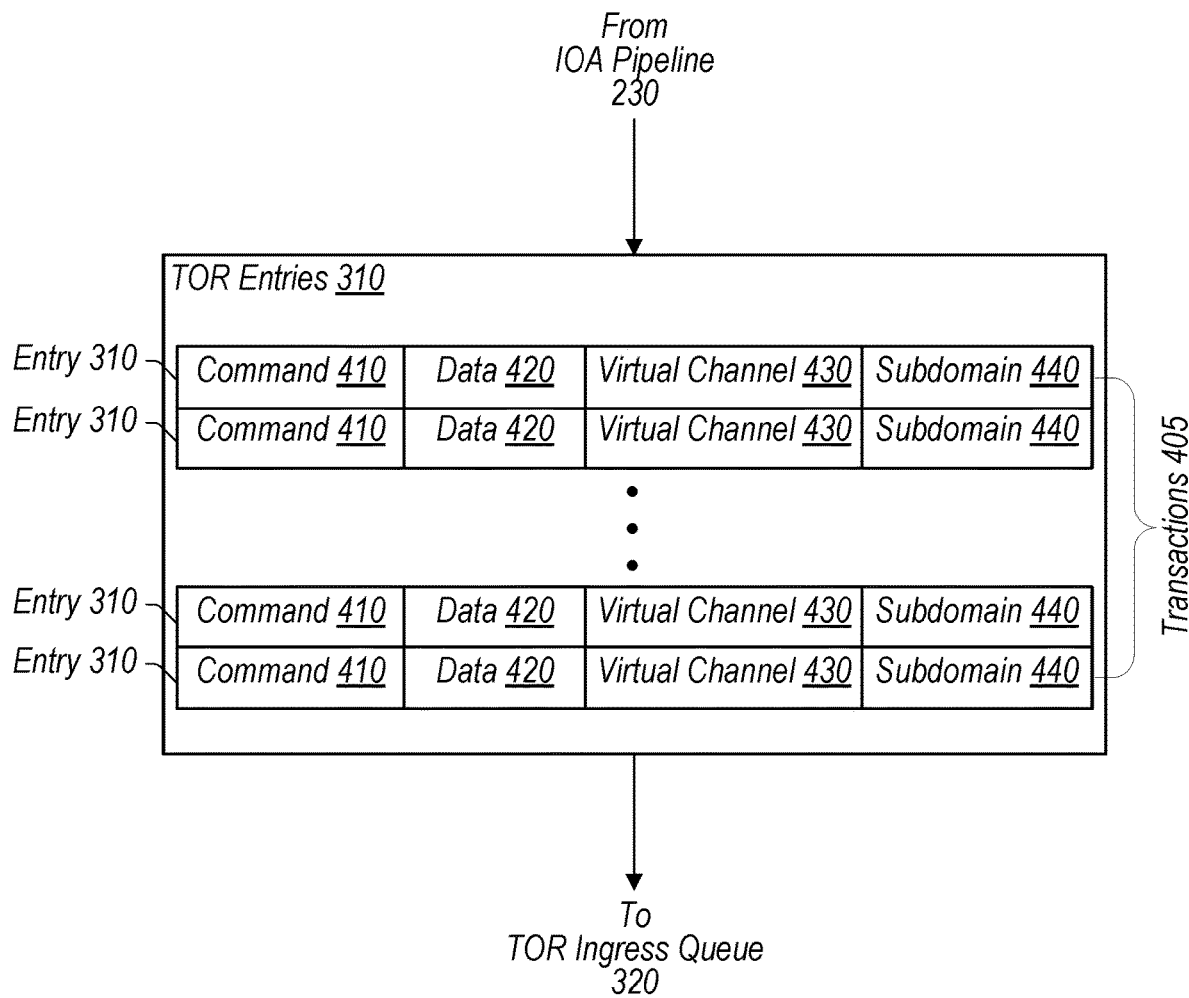
FIG. 4 is a block diagram illustrating example elements of TOR entries, according to some embodiments.

Turning now to FIG. 4, a block diagram of example elements included in a set of TOR entries 310 is shown. Within the illustrated embodiment, a TOR entry 310 include a command attribute 410, data 420, a virtual channel attribute 430, and a subdomain attribute 440. In some embodiments, a TOR entry 310 is implemented differently than shown. As an example, a TOR entry 310 might also identify the transaction type (e.g., non-posted non-relaxed ordered) of its transaction, the source of a transaction, and the destination for sending data (e.g., the originator of a snoop request).

A transaction 405 may be a read transaction, a write transaction, a snoop, etc. In various embodiments, a transaction 405 is associated with attributes that describe that transaction. The attributes may be extracted by IOA pipeline 230 from transactional information received from a peripheral 144 coupled to I/O agent 142 and then stored in an entry 310. Command 410, data 420, virtual channel 430, and subdomain 440 are examples of attributes that may be extracted and stored for a transaction 405.

Command attribute 410, in various embodiments, identifies the command(s)/action(s) to be performed for a transaction 405. As examples, command attribute 410 may indicate that a read or write request is to be sent to memory controller 120, a completion acknowledgement is to be sent to a peripheral 144 that issued the corresponding transaction, or the data of a cache line that is targeted by a snoop is to be invalidated. Data 420 may include write data provided by a transaction request received from a peripheral 144 or read data obtained from a component such as memory controller 120. In some cases, the commands identified by command attribute 410 may be updated as the corresponding transaction 405 makes passes through IOA pipeline 230. For example, on a first pass of a read transaction 405, the command attribute 410 of the TOR entry 310 for that transaction 405 may indicate that a read request is to be sent to memory controller 120. On a second pipeline pass through IOA pipeline 230, the command attribute 410 may be updated to indicate that the read data should be returned to the peripheral 144 that issued the transaction 405.

Virtual channel attribute 430, in various embodiments, specifies the virtual channel that is associated with a transaction 405. In particular, various components of SOC 100 may support multiple virtual channels. As such, a component, such as I/O agent 142, may employ resources dedicated to each virtual channel (e.g., buffers) so that communications on the virtual channels remain logically independent. As an example, buffers may be employed at each stopping point (e.g., network switch) along a channel from source to destination, so that there might be buffer space for a packet in a given channel unless that channel is blocked. The component may also employ arbitration circuitry configured to select among buffered communications to forward on the network. In various embodiments, arbitration policies are used that allow for any virtual channel to bypass another virtual channel if that other channel is unable to transmit a packet to the next stopping point. Consequently, virtual channels may be channels that physically share a network, but which are logically independent on that network (e.g., communications within one virtual channel do not block progress of communications on another virtual channel). As a result, if a given virtual channel is not able to make forward progress due to congestion within its channel, other virtual channels are not affected and can continue to make forward progress even though they are all being transported over the same physical channel. Examples of virtual channels can include low latency and bulk. Accordingly, the virtual channel attribute 430 of a transaction 405 may indicate whether that transaction 405 is low latency or bulk.

Subdomain attribute 440, in various embodiments, specifies the subdomain associated with a transaction 405. A virtual channel is different than a subdomain. For example, in various embodiments, subdomains are source specific and thus the space for a given subdomain is used for all transactions 405 of the subdomain, no matter which virtual channel that the transactions 405 are flowing in. Accordingly, a set of devices/peripherals 144 behind a particular interface (e.g., a USB interface that is coupled to I/O agent 142) may be assigned to the same subdomain but issue transactions 405 that belong to different virtual channels. Consequently, there can be multiple virtual channels in a subdomain and thus transactions of different virtual channels can be stored in association with the same subdomain. In some embodiments, multiple devices or interfaces that are coupled to I/O agent 142 may be assigned to the same subdomain. Assigning a given device or a given interface to a subdomain may include storing an indication of that device/interface (e.g., a globally unique identifier). Accordingly, subdomain attribute 440 may specify that indication or a value indicative of the subdomain.

In various embodiments, transactions that are associated with different subdomains are stored as entries 310 in the same memory bank of TOR 260. While transactions can be stored in the same memory bank, the transactions are ordered and executed in accordance with a set of ordering rules applied to their respective subdomain. In various embodiments, TOR linked lists 325 are used to preserve ordering among transactions of the same subdomain (and virtual channel, in some cases). In particular, there may be a TOR linked list 325 for each subdomain or subdomain virtual channel combination. When a transaction is allocated as an entry 310 in TOR bank 260, in various embodiments, an indication of that transaction is added to the TOR linked list 325 that maps to the subdomain of that transaction. The transaction can be released from that TOR linked list 325 to pipe arbiter 220 according to the set of ordering rules of that subdomain.

In various embodiments, the number of subdomains implemented by TOR bank 260 is configurable. The configuring may occur during an initialization phase of I/O agent 142 or in real-time during operation. In the latter case, I/O agent 142 may receive a request to adjust the number of subdomains (e.g., two subdomains) to a new number of subdomains (e.g., four) and in response to the request, drain TOR bank 260 of transactions before configuring it to support the new number of subdomains. In various embodiments, I/O agent 142 includes configuration registers that can be set to define the number of subdomains. The number of subdomains may be based on the interfaces or devices that are coupled to I/O agent 142. For example, I/O agent 142 may be coupled to an interface that supports 16 lanes (e.g., PCIe x16) and thus implement a single subdomain. Or, that I/O agent 142 may be coupled to two interfaces that each support 8 lanes and thus implement two subdomains, for example. In various embodiments, I/O agent 142 receives an indication of the bandwidth (e.g., to use 16 lanes) that is desired by an interface (or a set of devices) coupled to I/O agent. As such, the I/O agent 142 may set the configuration registers based on the bandwidth. I/O agent 142 may set the number of subdomains based on the interface instead of the devices/peripherals 144 behind that interface as I/O agent 142 may not be able to discern what devices coupled to that interface.

Figure 5A:
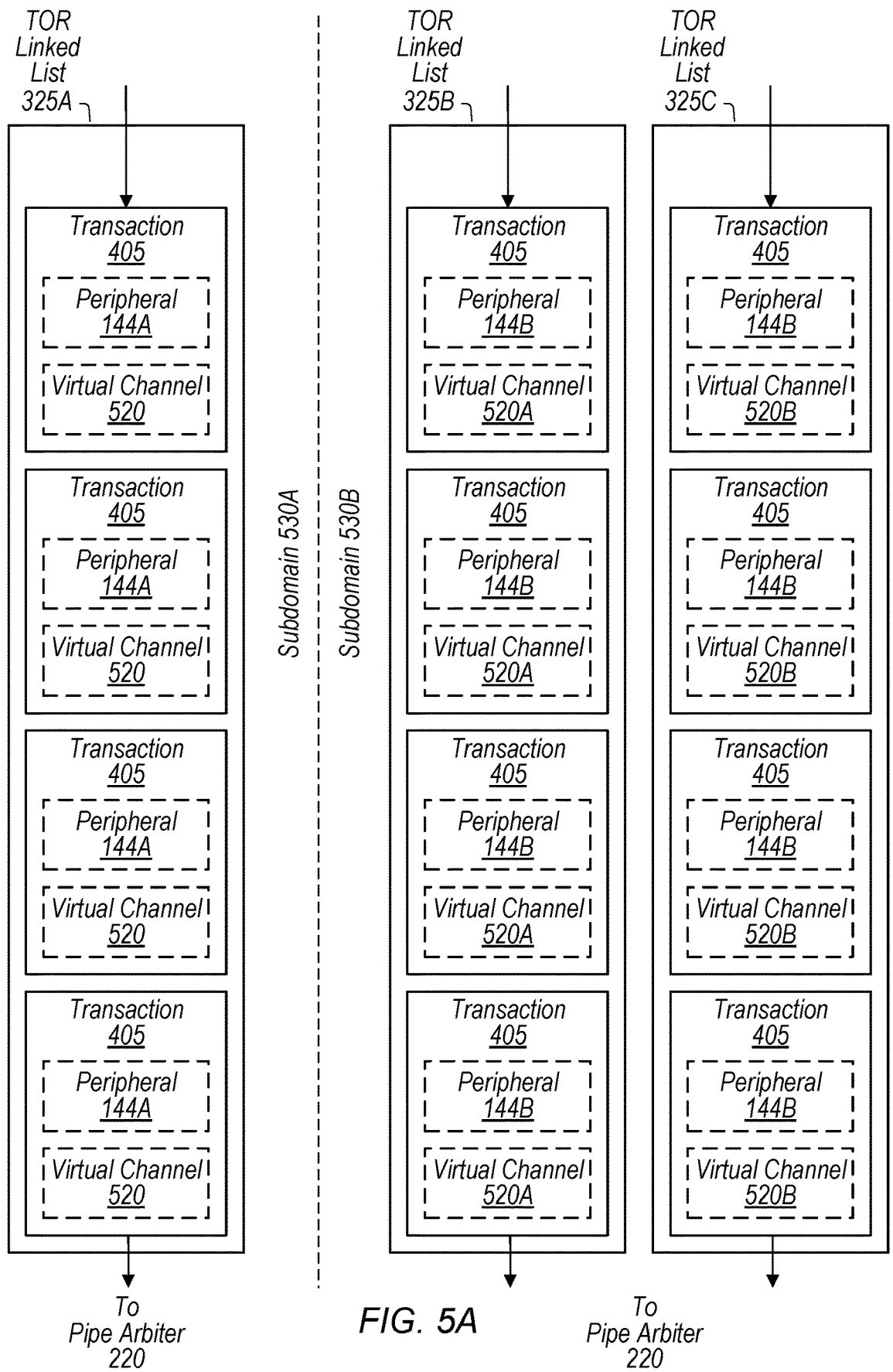
FIG. 5A is a block diagram illustrating example elements of TOR linked lists, according to some embodiments.

Turning now to FIG. 5A, a block diagram of example TOR linked lists 325 associated with subdomains 530 is shown. In the illustrated embodiment, there is a TOR linked list 325A that is associated with subdomain 530A, and TOR linked lists 325B-C that are associated with subdomain 530B. As shown, TOR linked list 325A stores transactions 405 from a peripheral 144A, and TOR linked lists 325B-C store transactions 405 from a peripheral 144B. As shown, TOR linked list 325B stores transactions 405 associated with a virtual channel 520A and TOR linked list 325C stores transactions 405 associated with a virtual channel 520B. The illustrated embodiment may be implemented differently than shown. For example, there may be a TOR linked list 325 that stores transactions 405 associated with different virtual channels.

As mentioned, a transaction 405 may make an initial pass through IOA pipeline 230 in which IOA pipeline 230 determines whether the transaction 405 should make another pipeline pass. If so, then IOA pipeline 230, in various embodiments, generates a TOR entry 310 having various attributes of that transaction 405 and enqueues an indication of the transaction 405 in the correct TOR linked list 325. The TOR linked list 325 in which a transaction 405 is enqueued may depend on the virtual channel 520 and subdomain 530 associated with the transaction 405. As an example, a request may be received from peripheral 144B to perform a transaction 405 associated with virtual channel 520A. In various embodiments, IOA pipeline 230 determines that peripheral 144B is associated with subdomain 530B (e.g., based on configuration registers or information in the request). Consequently, IOA pipeline 230 may enqueue that transaction 405 in TOR linked list 325B because it manages transactions 405 of virtual channel 520A and is associated with subdomain 530B. By enqueuing transactions 405 into a TOR linked list 325 bound to a virtual channel 520 and a subdomain 530, transactional ordering can be ensured for transactions within that virtual channel 520 and that subdomain 530.

Figure 5B:
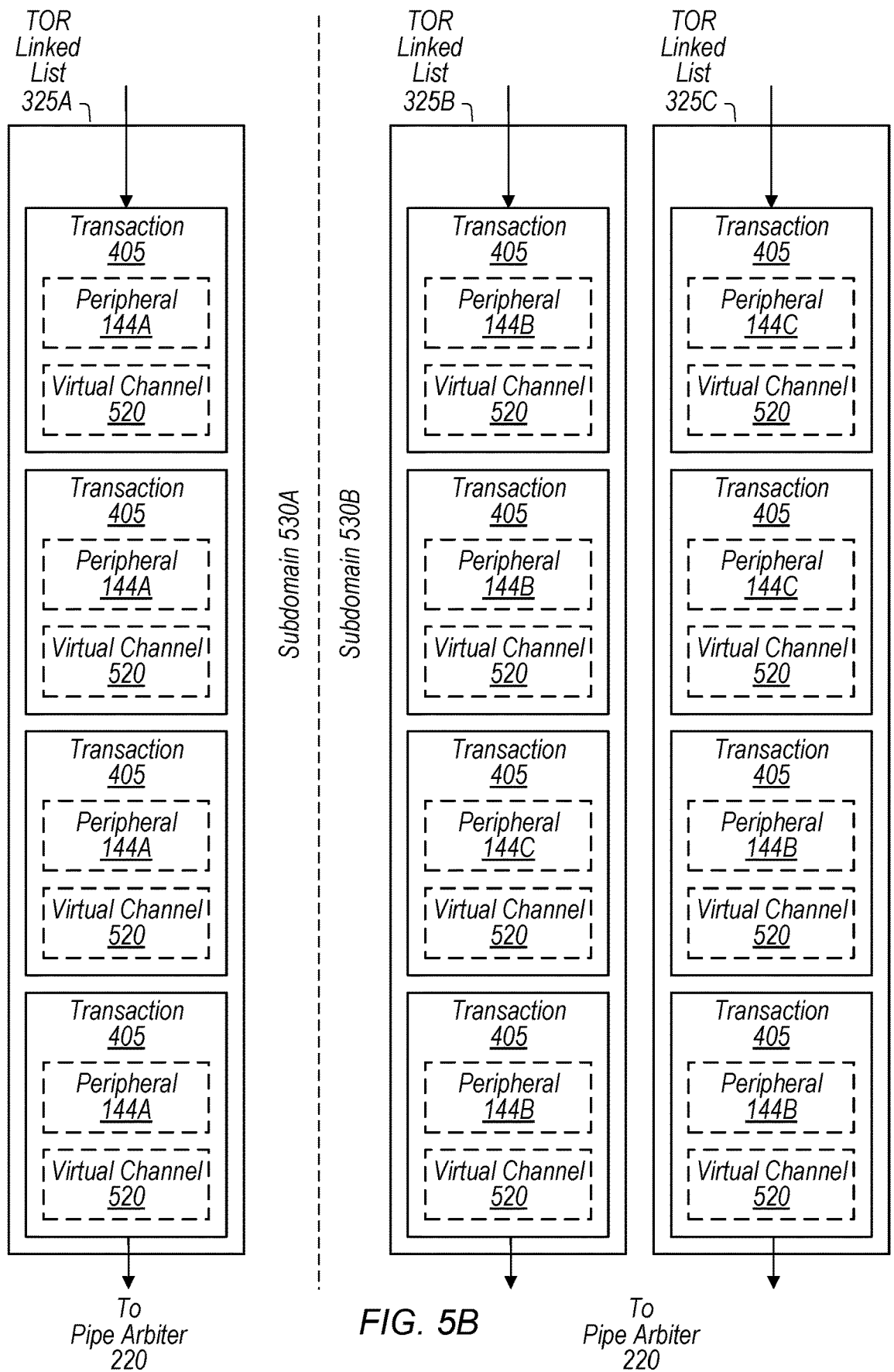
FIG. 5B is another block diagram illustrating other example TOR linked lists, according to some embodiments.

Turning now to FIG. 5B, a block diagram of a different set of example TOR linked lists 325 is shown. In the illustrated embodiment, there is a TOR linked list 325A that is associated with subdomain 530A, and TOR linked lists 325B-C that are associated with subdomain 530B. TOR linked list 325A stores transactions 405 from a peripheral 144A while TOR linked lists 325B-C store transactions 405 from peripherals 144B-C. The illustrated embodiment may be implemented differently than shown—e.g., TOR linked list 325B-C may store transactions 405 for different virtual channels.

In various embodiments, multiple peripherals 144 are assigned to the same subdomain 530. In some cases, multiple peripherals 144 share the same interface for communicating with I/O agent 142. Accordingly, I/O agent 142 may assign all peripherals 144 behind that interface to the same subdomain 530. In some cases, I/O agent 142 may implement less subdomains 530 than there are peripherals 144 coupled to I/O agent 142 and thus I/O agent 142 assign multiple peripherals 144 to the same subdomain 530. Peripherals 144 assigned to the same subdomain 530 may share one or more TOR linked lists 325. As illustrated for example, TOR linked lists 325B-C both store transactions 405 that are associated with peripherals 144B-C.

Figure 6:
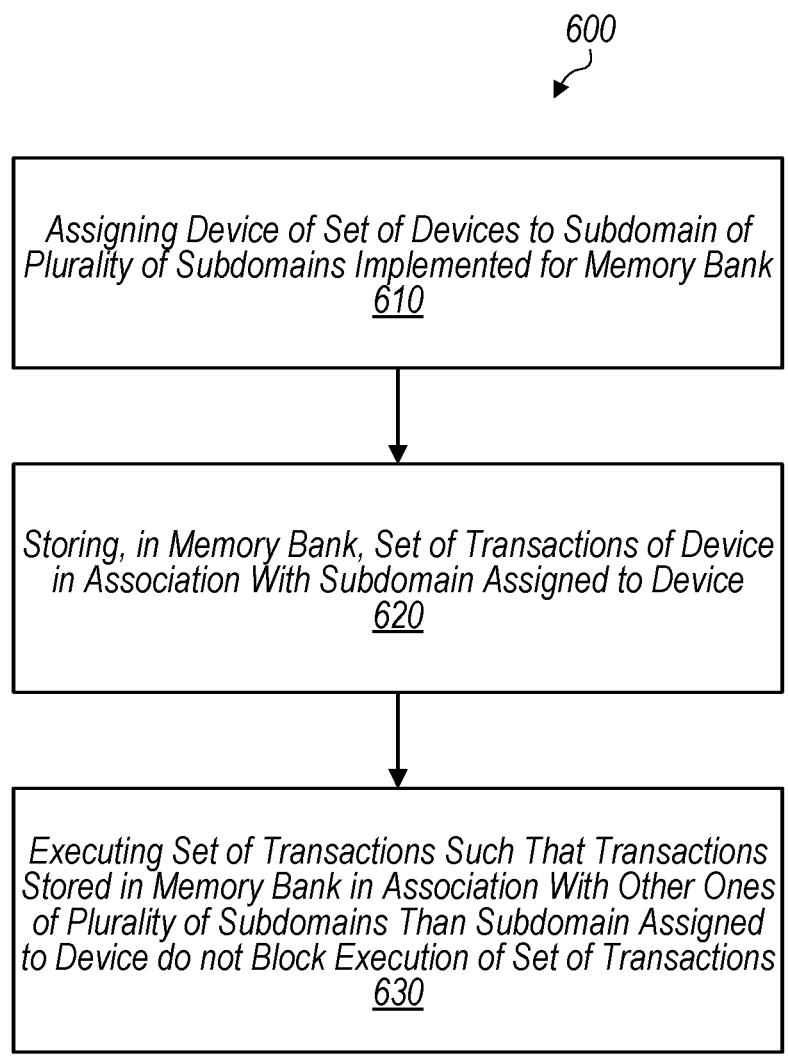
FIGS. 6-8 are flow diagrams illustrating example methods relating to storing, in a single memory bank, transactions in association with subdomains, according to some embodiments.

Turning now to FIG. 6, a flow diagram of a method 600 is shown. Method 600 is one embodiment of a method that is performed by an I/O agent circuit (e.g., an I/O agent 142) that involves storing, in a single memory bank (e.g., TOR bank 260), transactions (e.g., transactions 405) in association with subdomains (e.g., subdomains 530). In some embodiments, method 600 includes more or less steps than shown—e.g., a step in which the I/O agent circuit issues requests to a memory controller for cache line data.

Method 600 begins in step 610 with the I/O agent circuit assigning a device of a set of devices (e.g., peripherals 144) coupled to the I/O agent circuit to a subdomain of a plurality of subdomains implemented for a memory bank. The device may be associated with an interface (e.g., an ATC cable) that includes an interface identifier that is used to identify the device. To assign the device to the subdomain, in some embodiments, the I/O agent circuit is configured to assign the interface identifier to the subdomain. In some embodiments, the I/O agent circuit is configured to receive an indication of a bandwidth associated with the set of devices and set a number of subdomains in the plurality of subdomains based on the bandwidth. The I/O agent circuit may set the number of subdomains during initialization of the I/O agent circuit. The I/O agent circuit may assign another device of the set of devices to the subdomain.

In step 620, the I/O agent circuit stores, in the memory bank, a set of transactions of the device in association with the subdomain assigned to the device. In various embodiments, the IOA agent circuit is configured to store transactions that are of different virtual channels in association with the same subdomain in the memory bank.

In step 630, the I/O agent circuit executes the set of transactions such that transactions stored in the memory bank in association with other ones of the plurality of subdomains than the subdomain assigned to the device do not block execution of the set of transactions. In some embodiments, the I/O agent circuit is configured to execute transactions of a given subdomain in accordance with a set of ordering rules for that given subdomain-ordering of transactions may be contained within the given subdomain. The I/O agent circuit may also be configured to receive a request to adjust the number of subdomains to a new number of subdomains, drain the memory bank of transactions, and then set the memory bank to support the new number of subdomains.

In various embodiments, a system (e.g., SOC 100) having the I/O agent circuit includes a second I/O agent circuit that includes a second memory bank and is coupled to a second set of devices. The second I/O agent circuit may be configured to store, in the second memory bank, transactions of the second set of devices in association with a single domain implemented for that memory bank. In some embodiments, the system includes a set of caching agents and a memory management circuit coupled to the I/O agent circuit and also configured to maintain memory coherency among the set of caching agents. The memory management circuit may be configured to manage the memory bank as a single caching agent for the set of devices.

Figure 7:
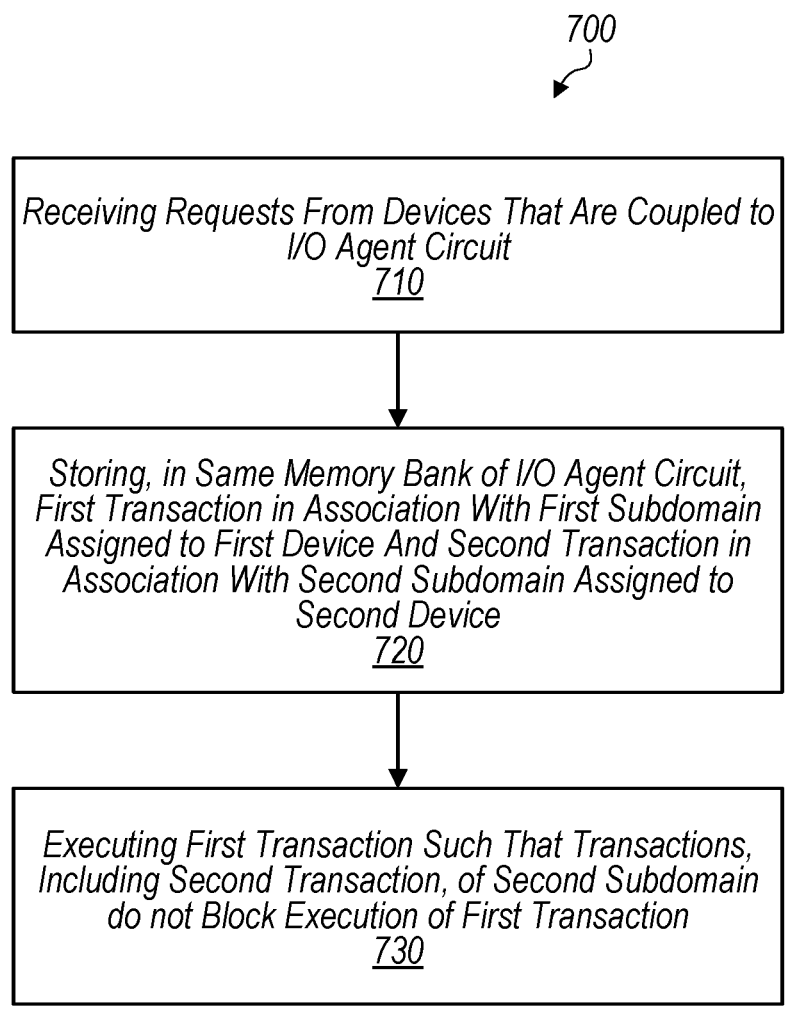

Turning now to FIG. 7, a flow diagram of a method 700 is shown. Method 700 is one embodiment of a method that is performed by an I/O agent circuit (e.g., an I/O agent 142) that involves storing, in a single memory bank (e.g., TOR bank 260), transactions (e.g., transactions 405) in association with subdomains (e.g., subdomains 530). In some embodiments, method 700 includes more or less steps than shown—e.g., a step in which the I/O agent circuit issues requests to a memory controller for cache line data.

Method 700 begins in step 710 with the I/O agent circuit receiving, from devices (e.g., peripherals 144) that that are coupled to the I/O agent circuit, requests that include a request from a first device to perform a first transaction and a request from a second device to perform a second transaction. In step 720, the I/O agent circuit stores, in a same memory bank of the I/O agent circuit, the first transaction in association with a first subdomain assigned to the first device and the second transaction in association with a second, different subdomain assigned to the second device. In various embodiments, the I/O agent circuit assigns the first device to the first subdomain by configuring a set of registers with an interface identifier used on an interface to which the I/O agent circuit is coupled to identify the first device. The I/O agent circuit may configure a number of subdomains that are utilized in the memory bank based on the devices that are coupled to the I/O agent circuit.

In step 730, the I/O agent circuit executes the first transaction such that transactions, including the second transaction, of the second subdomain do not block execution of the first transaction. At least two transactions that are part of different virtual channels may be stored in the memory bank in association with the first subdomain. The at least two transactions may be received from the first device.

Figure 8:
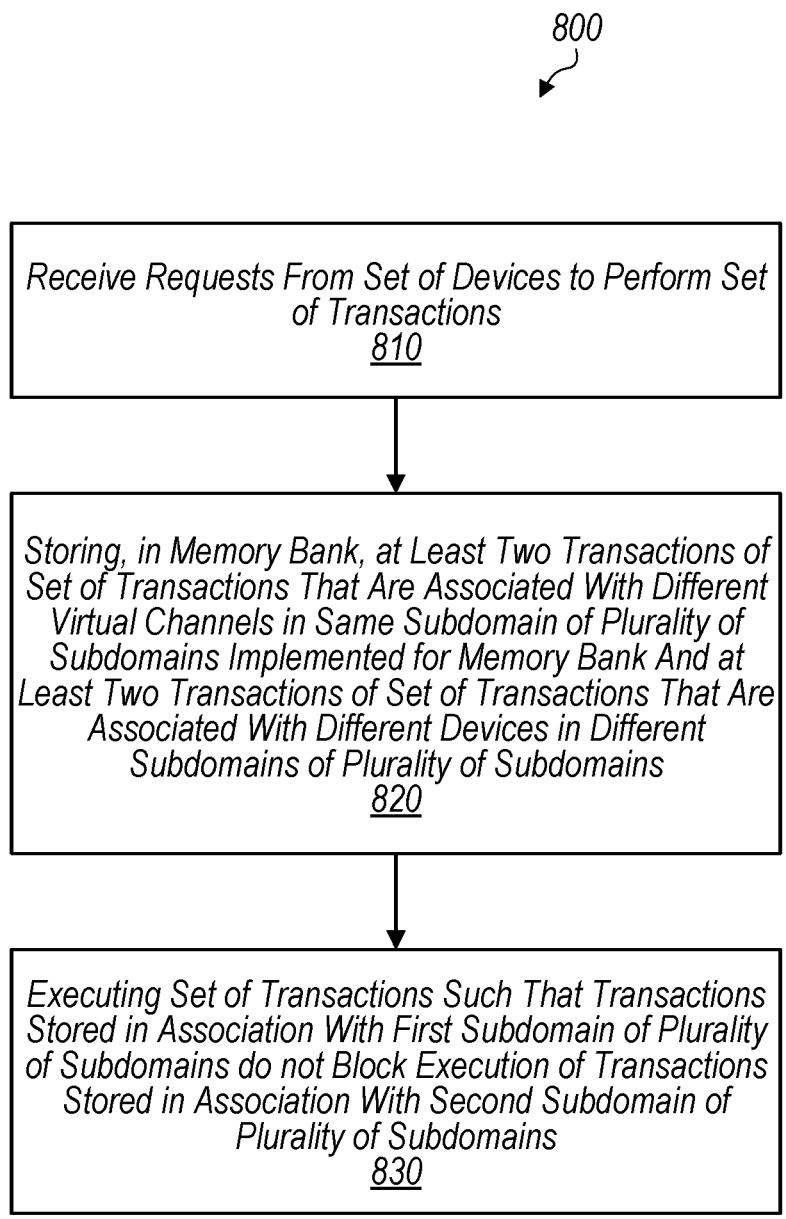

Turning now to FIG. 8, a flow diagram of a method 800 is shown. Method 800 is one embodiment of a method that is performed by an I/O agent circuit (e.g., an I/O agent 142) that involves storing, in a single memory bank (e.g., TOR bank 260), transactions (e.g., transactions 405) in association with subdomains (e.g., subdomains 530). In some embodiments, method 800 includes more or less steps than shown—e.g., a step in which the I/O agent circuit issues requests to a memory controller for cache line data.

Method 800 begins in step 810 with the I/O agent circuit receiving requests from a set of local functional circuits coupled to the I/O agent circuit to perform a set of transactions. In step 820, the I/O agent circuit stores, in the memory bank, at least two transactions of the set of transactions that are associated with different virtual channels in a same subdomain of a plurality of subdomains implemented for the memory bank and at least two transactions of the set of transactions that are associated with different local functional circuits in different subdomains of the plurality of subdomains. In some embodiments, the I/O agent circuit is configured to store, in the memory bank, at least two transactions of the set of transactions that are associated with different local functional circuits in a same subdomain of the plurality of subdomains.

In step 830, the I/O agent circuit executes the set of transactions such that transactions stored in association with a first subdomain of the plurality of subdomains do not block the execution of transactions stored in association with a second subdomain of the plurality of subdomains. In various embodiments, the I/O agent circuit is further configured to execute the transactions stored in association with the first subdomain according to a set of ordering rules that define an ordering in which the transactions of the first subdomain are to be executed.

In various embodiments, the system that includes the I/O agent circuit further includes a set of caching agents and a memory management circuit coupled to the I/O agent circuit and configured to maintain memory coherency among the set of caching agents. The memory management circuit may be configured to manage the memory bank as a single caching agent for the set of devices. In some embodiments, the system includes a second I/O agent circuit that includes a second memory bank and is coupled to a second set of devices. The second I/O agent circuit may be configured to store, in the second memory bank, transactions of the second set of devices in association with a single domain implemented for the second memory bank.

Figure 9:
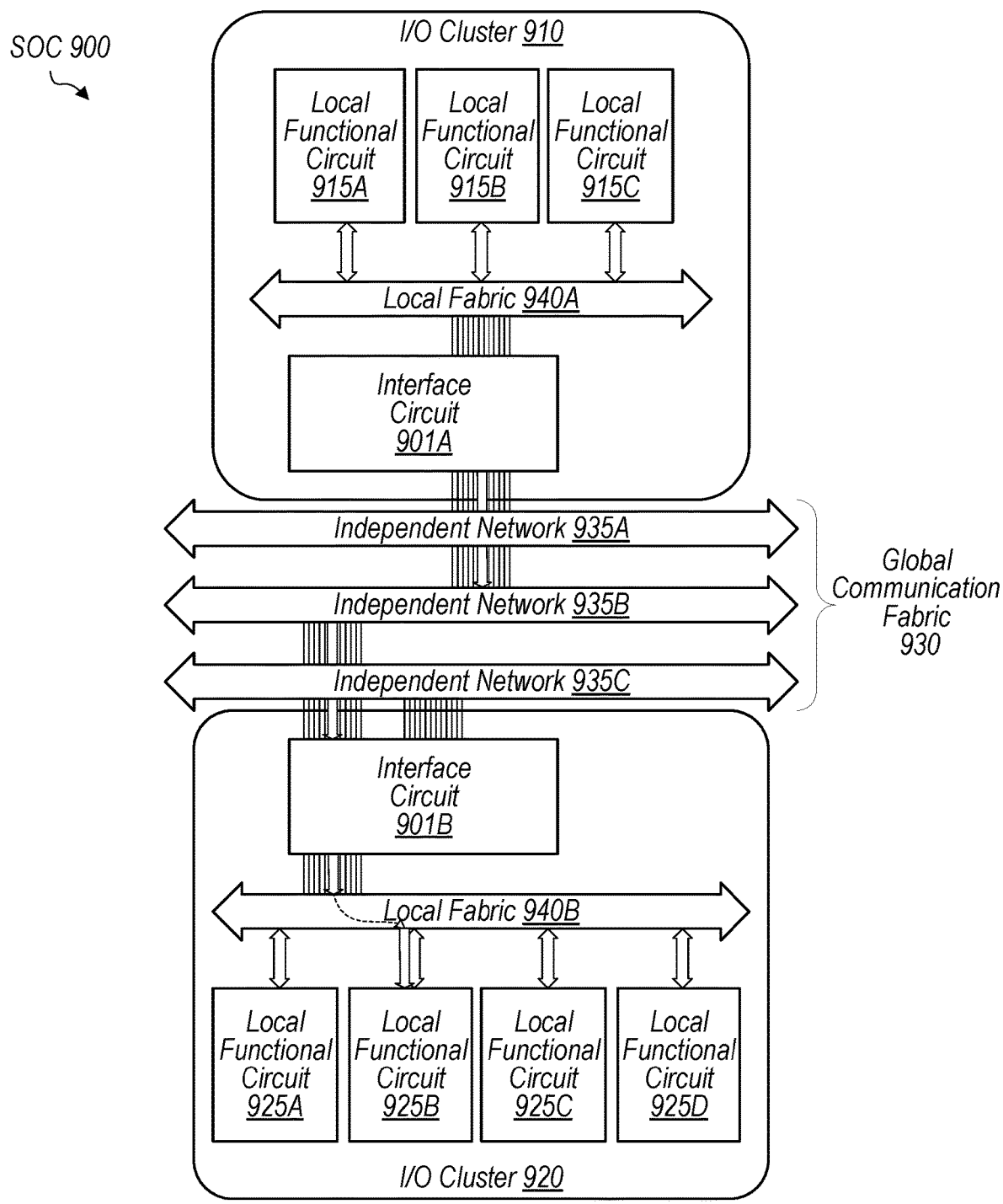
FIG. 9 is a block diagram illustrating example elements of an SOC that includes multiple independent networks as well as local fabrics, according to some embodiments.

Turning now to FIG. 9, a block diagram of example elements of an SOC that includes multiple independent networks as well as local fabrics is shown. SOC 900 is an embodiment of SOC 100. In the illustrated embodiment, SOC 900 includes a pair of interface circuits 901A and 901B (collectively referred to as interface circuits 901) each coupling a respective local fabric 940A and 940B (collectively 940) to one or more independent networks 935A-935C of global communication fabric 930 (which is an embodiment of interconnect 105). Interface circuits 901A and 901B are embodiments of different I/O agents 142. Local fabric 940A is coupled to a set of local functional circuits 915A-915C (915 collectively) and local fabric 940B is coupled to a set of local functional circuits 925A-925D (925 collectively). Interface circuit 901A, local fabric 940A, and the set of local functional circuits 915 are included in input/output (I/O) cluster 910. In a similar manner, interface circuit 901B, local fabric 940B, and the set of local functional circuits 925 are included in I/O cluster 920. I/O cluster 910 and/or I/O cluster 920 are an I/O cluster 140 in various embodiments.

As shown, global communication fabric 930 includes multiple independent networks 935A-935C, wherein ones of independent networks 935A-935C have different communication and coherency protocols. For example, independent network 935A may be a CPU network that supports cache coherency as well as low-latency transactions between a plurality of CPU cores and one or more memory controllers to access, e.g., volatile and non-volatile memories. Independent network 935B may, in some embodiments, be a relaxed-order network that does not enforce cache coherency and may support lowest quality-of-service (QOS) bulk transactions as well higher QoS low-latency transactions. Components coupled to independent network 935B may include functional circuits that include their own memory resources, and are, therefore, not dependent on memory resources accessed via global communication fabric 930. Independent network 935C may, for example, be an input/output (I/O) network that also supports cache coherency and low-latency transactions between memories and some peripheral circuits. Such an I/O network may further support additional protocols such as real-time transactions that have a higher QoS than low-latency transactions. For example, peripheral circuits (which are coupled to or include peripherals 144 in various embodiments) used in a smartphone may include I/O circuits for communicating with a cellular radio and utilizing real-time priorities to manage an active phone call.

I/O clusters 910 and 920, as illustrated, include different sets of local functional circuits 915 and 925, respectively. I/O cluster 910 is coupled to independent network 935B of global communication fabric 930, while I/O cluster 920 is coupled to independent networks 935B and 935C. I/O cluster 910 may include, for example, a set of serial interfaces, such as universal serial bus (USB) circuits for communicating with USB peripherals. I/O cluster 920, on the other hand, may include a set of display circuits for communicating with one or more display devices. Individual ones of local functional circuits 915 may perform different functions. For example, local functional circuit 915A may be a USB interface coupled to a USB port on a device that includes SOC 900, local functional circuit 915B may be a Firewire® interface coupled to a Firewire port on the device, and local functional circuit 915C may be a Bluetooth interface to a Bluetooth radio included in the device.

Local fabric 940A supports communication between respective ones of local functional circuits 915 and, similarly, local fabric 940B supports communication between respective ones of local functional circuits 925. Each of local fabrics 940 includes at least one communication bus for exchanging transactions locally among the respective groups of local functional circuits 915 and 925. In various embodiments, either of local fabrics 940 may include additional buses, arranged in any suitable topology (e.g., mesh, ring, tree, etc.), that are coupled together via one or more bus multiplexing circuits.

Interface circuit 901B, coupled to local fabric 940B, is configured to bridge transactions between local functional circuits 925 and global communication fabric 930. For example, data for new image frames and/or overlays for a currently displayed image may be sent from a CPU or a GPU included elsewhere in SOC 900 to one or more of local functional circuits 925 to be shown on one of the display devices. In a similar manner, interface circuit 901A, coupled to local fabric 940A, is configured to bridge transactions between local functional circuits 915 and global communication fabric 930. Interface circuits 901A and 901B, as shown, are arranged such that they operate between I/O clusters 910 and 920, respectively, and global communication fabric 930.

It is noted that the SOC of FIG. 9 is merely an example for demonstrating the disclosed concepts. In other embodiments, different combinations of elements may be included in the SOC. For example, any suitable number of I/O cluster may be included, with each cluster including any suitable number of functional circuits. Although the global communication fabric is shown with three independent networks, any suitable number of independent networks may be included, in other embodiments. In some embodiments, the illustrated elements may be arranged in a different manner. The SOC of FIG. 9 is described as including several networks that may support various communication and coherency protocols. Various network topologies, with associated protocols are contemplated. Three such network topologies that may be utilized in a global communication fabric are disclosed in FIGS. 10-13.

Figure 10:
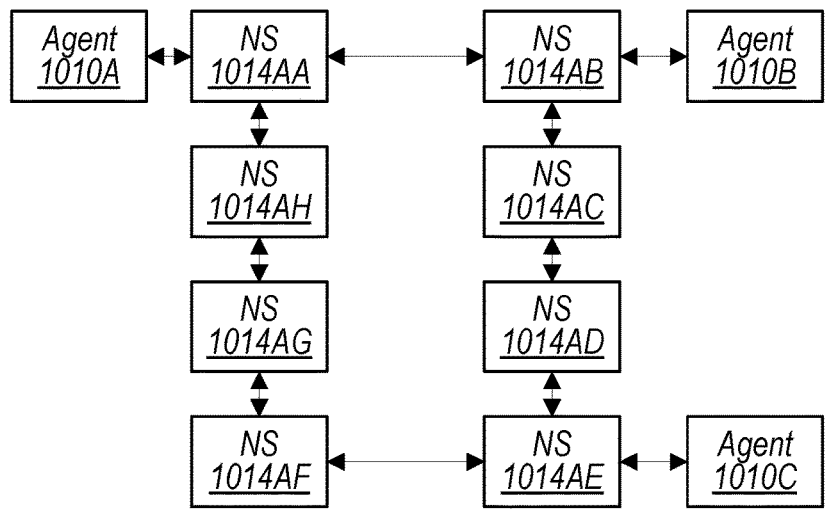
FIG. 10 is a block diagram illustrating example elements of a network that uses a ring topology, according to some embodiments.

Turning now to FIG. 10, a block diagram of one embodiment of a network 1000 using a ring topology to couple a plurality of agents (e.g., I/O agents 142) is shown. In the example of FIG. 10, the ring is formed from network switches 1014AA-1014AH. Agent 1010A is coupled to network switch 1014AA, agent 1010B is coupled to network switch 1014AB, and agent 1010C is coupled to network switch 1014AE.

As shown, a network switch is a circuit that is configured to receive communications on a network and forward the communications on the network in the direction of the destination of the communication. For example, a communication sourced by a processor (e.g., processor 112) may be transmitted to a memory controller (e.g., a memory controller 120) that controls the memory (e.g., a memory 130) that is mapped to the address of the communication. At each network switch, the communication may be transmitted forward toward the memory controller. If the communication is a read, the memory controller may communicate the data back to the source and each network switch may forward the data on the network toward the source. In an embodiment, the network may support a plurality of virtual channels. The network switch may employ resources dedicated to each virtual channel (e.g., buffers, queues, such as queues 255, or linked lists 325 within a queue) so that communications on the virtual channels may remain logically independent. The network switch may also employ arbitration circuitry to select among buffered communications to forward on the network. Virtual channels may be channels that physically share a network but which are logically independent on the network (e.g., communications in one virtual channel do not block progress of communications on another virtual channel).

In a ring topology, each network switch 1014AA-1014AH may be connected to two other network switches 1014AA-1014AH, and the switches form a ring such that any network switch 1014AA-1014AH may reach any other network switch in the ring by transmitting a communication on the ring in the direction of the other network switch. A given communication may pass through one or more intermediate network switches in the ring to reach the targeted network switch. When a given network switch 1014AA-1014AH receives a communication from an adjacent network switch 1014AA-1014AH on the ring, the given network switch may examine the communication to determine if an agent 1010A-1010C to which the given network switch is coupled is the destination of the communication. If so, the given network switch may terminate the communication and forward the communication to the agent. If not, the given network switch may forward the communication to the next network switch on the ring (e.g., the other network switch 1014AA-1014AH that is adjacent to the given network switch and is not the adjacent network switch from which the given network switch received the communication). As used herein, an "adjacent network switch" to a given network switch may be a network switch to which the given network switch may directly transmit a communication, without the communication traveling through any intermediate network switches.

Figure 11:
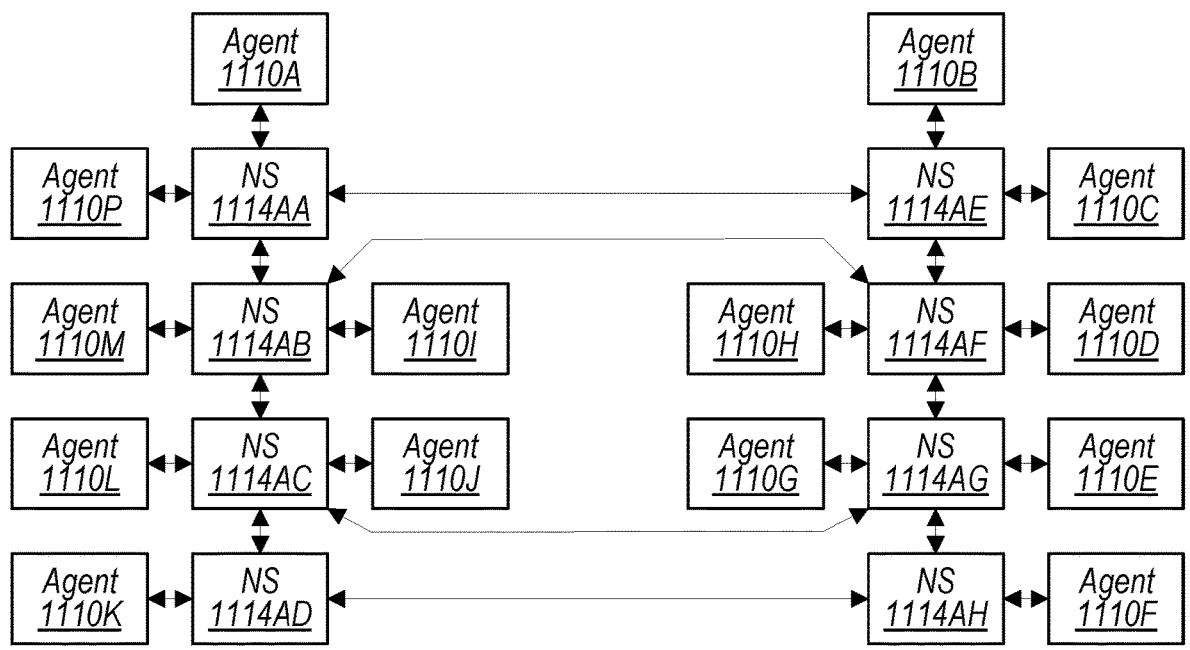
FIG. 11 is a block diagram illustrating example elements of a network that uses a mesh topology, according to some embodiments.

Turning now to FIG. 11, a block diagram of one embodiment of a network 1100 using a mesh topology to couple agents 1110A-1110P (e.g., I/O agents 142) is illustrated. As shown in FIG. 11, network 1100 may include network switches 1114AA-1114AH. Network switches 1114AA- 1114AH are coupled to two or more other network switches. For example, network switch 1114AA is coupled to network switches 1114AB and 1114AE; network switch 1114AB is coupled to network switches 1114AA, 1114AF, and 1114AC; etc. as illustrated in FIG. 11. Thus, individual network switches in a mesh network may be coupled to a different number of other network switches. Furthermore, while network 1100 has a relatively symmetrical structure, other mesh networks may be asymmetrical, for example, depending on the various traffic patterns that are expected to be prevalent on the network. At each network switch 1114AA-1114AH, one or more attributes of a received communication may be used to determine the adjacent network switch 1114AA-1114AH to which the receiving network switch 1114AA-1114AH will transmit the communication (unless an agent 1110A-1110P to which the receiving network switch 1114AA-1114AH is coupled is the destination of the communication, in which case the receiving network switch 1114AA-1114AH may terminate the communication on network 1100 and provide it to the destination agent 1110A-1110P). For example, in an embodiment, network switches 1114AA-1114AH may be programmed at system initialization to route communications based on various attributes.

In an embodiment, communications may be routed based on the destination agent. The routings may be configured to transport the communications through the fewest number of network switches (the "shortest path") between the source and destination agent that may be supported in the mesh topology. Alternatively, different communications for a given source agent to a given destination agent may take different paths through the mesh. For example, latency-sensitive communications may be transmitted over a shorter path while less critical communications may take a different path to avoid consuming bandwidth on the short path, where the different path may be less heavily loaded during use, for example. Additionally, a path may change between two particular network switches for different communications at different times. For example, one or more intermediate network switches in a first path used to transmit a first communication may experience heavy traffic volume when a second communication is sent at a later time. To avoid delays that may result from the heavy traffic, the second communication may be routed via a second path that avoids the heavy traffic.

FIG. 11 may be an example of a partially-connected mesh: at least some communications may pass through one or more intermediate network switches in the mesh. A fully-connected mesh may have a connection from each network switch to each other network switch, and thus any communication may be transmitted without traversing any intermediate network switches. Any level of interconnectedness may be used in various embodiments.

Figure 12:
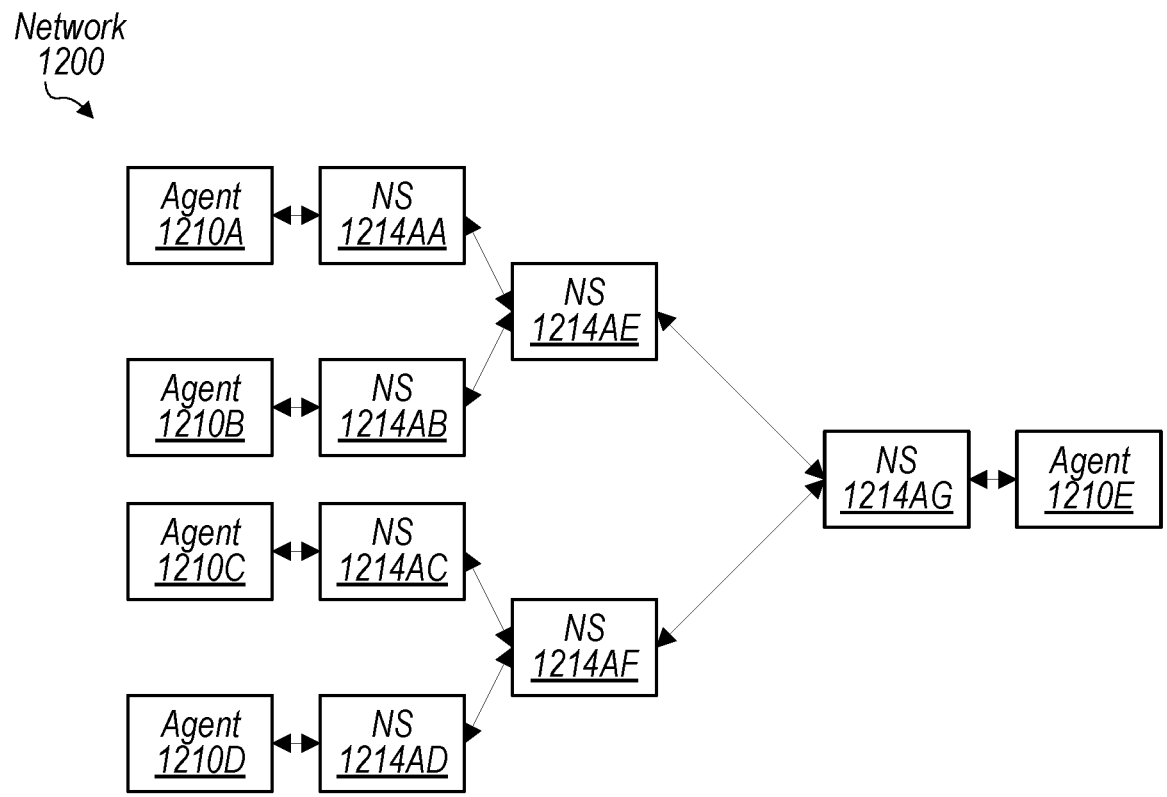
FIG. 12 is a block diagram illustrating example elements of a network that uses a tree topology, according to some embodiments.

Turning now to FIG. 12, a block diagram of one embodiment of a network 1200 using a tree topology to couple agents 1210A-1210E (e.g., I/O agents 142) is shown. The network switches 1214AA-1214AG are interconnected to form the tree in this example. The tree is a form of hierarchical network in which there are edge network switches (e.g., 1214AA, 1214AB, 1214AC. 1214AD, and 1214AG in FIG. 12) that couple, respectively, to agents 1210A-1210E and intermediate network switches (e.g., 1214AE and 1214AF in FIG. 12) that couple only to other network switches. A tree network may be used, e.g., when a particular agent is often a destination and/or a source for communications issued by other agents. Thus, for example, network 1200 may be used for agent 1210E being a principal source and/or destination for communications to/from agents 1210A-1210D. For example, the agent 1210E may be a memory controller which would frequently be a destination for memory transactions.

There are many other possible topologies that may be used in other embodiments. For example, a star topology has a source/destination agent in the "center" of a network and other agents may couple to the center agent directly or through a series of network switches. Like a tree topology, a star topology may be used in a case where the center agent is frequently a source or destination of communications. A shared bus topology may be used, and hybrids of two or more of any of the topologies may be used.

FIGS. 10-12 illustrate a variety of network topologies that may be used in a given SOC (e.g., SOC 100). In some embodiments, an SOC may include more than one type of network topology in a single SOC. Referring back to FIG. 9 for example, independent network 935A may have a ring topology, independent network 935B may have a mesh topology, and independent network 935C may have a tree topology. Any suitable combination of topologies are contemplated for other embodiments. Another SOC with multiple types of network topologies is shown in FIG. 13.

Figure 13:
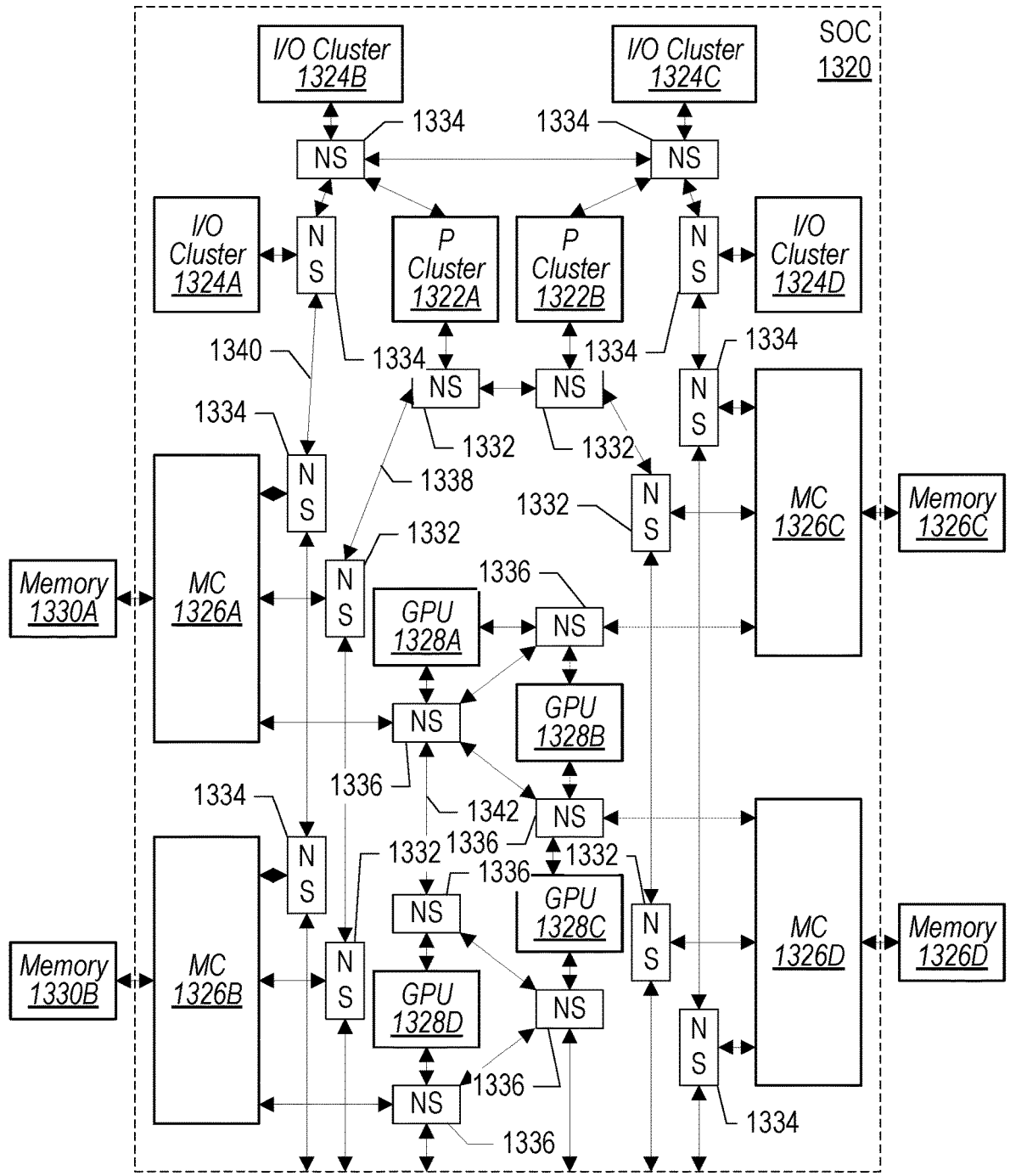
FIG. 13 is a block diagram illustrating example elements of another SOC that includes multiple networks, according to some embodiments.

Turning now to FIG. 13, a block diagram of one embodiment of an SOC 1320 having multiple networks with different topologies is illustrated. SOC 1320 is an embodiment of SOC 100. In the illustrated embodiment, the SOC 1320 includes a plurality of processor clusters (P clusters) 1322A-1322B, a plurality of input/output (I/O) clusters 1324A-1324D, a plurality of memory controllers 1326A-1326D, and a plurality of graphics processing units (GPUs) 1328A-1328D. The memories 1330A-1330D are coupled to the SOC 1320, and more specifically to the memory controllers 1326A-1326D respectively as shown in FIG. 13. As implied by the name (SOC), the components illustrated in FIG. 13 (except for the memories 1330A-1330D in this embodiment) may be integrated onto a single semiconductor die or "chip." However, other embodiments may employ two or more die coupled or packaged in any desired fashion.

In the illustrated embodiment, the SOC 1320 includes three physically and logically independent networks formed from a plurality of network switches 1332, 1334, and 1336 as shown in FIG. 13 and interconnect therebetween, illustrated as arrows between the network switches and other components. Collectively, these independent networks form a global communication fabric, enabling transactions to be exchanged across SOC 1320. Other embodiments may include more or fewer networks. The network switches 1332, 1334, and 1336 may be instances of network switches similar to the network switches as described above with regard to FIGS. 10-12, for example. The plurality of network switches 1332, 1334, and 1336 are coupled to the plurality of P clusters 1322A-1322B, the plurality of GPUs 1328A-1328D, the plurality of memory controllers 1326A-1325B, and the plurality of I/O clusters 1324A-1324D as shown in FIG. 13. The P clusters 1322A-1322B, the GPUs 1328A-1328B, the memory controllers 1326A-1326B, and the I/O clusters 1324A-1324D may all be examples of agents that communicate on the various networks of the SOC 1320. Other agents may be included as desired. In some embodiments, ones of I/O clusters 1324A-1324D may correspond to I/O clusters 140. It is noted that the complexity of the multiple independent networks of SOC 1320 may hinder or prevent direct access to interface circuits 901 of FIG. 9.

In FIG. 13, a central processing unit (CPU) network is formed from a first subset of the plurality of network switches (e.g., network switches 1332) and interconnect therebetween such as reference numeral 1338. The CPU network couples the P clusters 1322A-1322B and the memory controllers 1326A-1326D. An I/O network is formed from a second subset of the plurality of network switches (e.g., network switches 1334) and interconnect therebetween such as reference numeral 1340. The I/O network couples the P clusters 1322A-1322B, the I/O clusters 1324A-1324D, and the memory controllers 1326A-1326B. A relaxed order network is formed from a third subset of the plurality of network switches (e.g., network switches 1336) and interconnect therebetween such as reference numeral 1342. The relaxed order network couples the GPUs 1328A-1328D and the memory controllers 1326A-1326D. In an embodiment, the relaxed order network may also couple selected ones of the selected ones of the I/O clusters 1324A-1324D as well.

As mentioned above, the CPU network, the I/O network, and the relaxed order network are independent of each other (e.g., logically and physically independent). In an embodiment, the protocol on the CPU network and the I/O network supports cache coherency (e.g., the networks are coherent). The relaxed order network may not support cache coherency (e.g., the network is non-coherent). The relaxed order network also has reduced ordering constraints compared to the CPU network and I/O network. For example, in an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered. In an embodiment, only communications to the same address (at a given granularity, such as a cache block) between the same source and destination agent may be ordered. Because less strict ordering is enforced on the relaxed-order network, higher bandwidth may be achieved on average since transactions may be permitted to complete out of order if younger transactions are ready to complete before older transactions, for example.

The interconnect between the network switches 1332, 1334, and 1336 may have and form and configuration, in various embodiments. For example, in one embodiment, the interconnect may be point-to-point, unidirectional links (e.g., busses or serial links). Packets may be transmitted on the links, where the packet format may include data indicating the virtual channel and subchannel that a packet is travelling in, memory address, source and destination agent identifiers, data (if appropriate), etc. Multiple packets may form a given transaction. A transaction may be a complete communication between a source agent and a target agent. For example, a read transaction may include a read request packet from the source agent to the target agent, one or more coherence message packets among caching agents and the target agent and/or source agent if the transaction is coherent, a data response packet from the target agent to the source agent, and possibly a completion packet from the source agent to the target agent, depending on the protocol. A write transaction may include a write request packet from the source agent to the target agent, one or more coherence message packets as with the read transaction if the transaction is coherent, and possibly a completion packet from the target agent to the source agent. The write data may be included in the write request packet or may be transmitted in a separate write data packet from the source agent to the target agent, in an embodiment.

In an embodiment, the SOC 1320 may be designed to couple directly to one or more other instances of the SOC 1320, coupling a given network on the instances as logically one network on which an agent on one die may communicate logically over the network to an agent on a different die in the same way that the agent communicates within another agent on the same die. While the latency may be different, the communication may be performed in the same fashion. Thus, as illustrated in FIG. 16, the networks extend to the bottom of the SOC 1320 as oriented in FIG. 13. Interface circuitry (e.g., serializer/deserializer (SERDES) circuits), not shown in FIG. 13, may be used to communicate across the die boundary to another die. In other embodiments, the networks may be closed networks that communicate only intra-die.

As mentioned above, different networks may have different topologies. In the embodiment of FIG. 13, for example, the CPU and I/O networks implement a ring topology, and the relaxed order may implement a mesh topology. However, other topologies may be used in other embodiments.

It is noted that the SOC of FIG. 13 is merely an example. Elements for illustrated the disclosed concepts are shown while other elements typical of an SOC have been omitted for clarity. For example, while specific numbers of P clusters 1322A-1322B, I/O clusters 1324A-1324D, memory controllers 1326A-1326D, and GPUs 1328A-1328D are shown in the example of FIG. 13, the number and arrangement of any of the above components may be varied and may be more or less than the number shown in FIG. 13.

In the descriptions of I/O clusters in FIG. 9, reference is made to formats for transactions sent via a local fabric and via the independent networks of the global communication fabric. Formats for data packets used on a given type of bus or network may be implemented in a variety of fashions.

Figure 14:
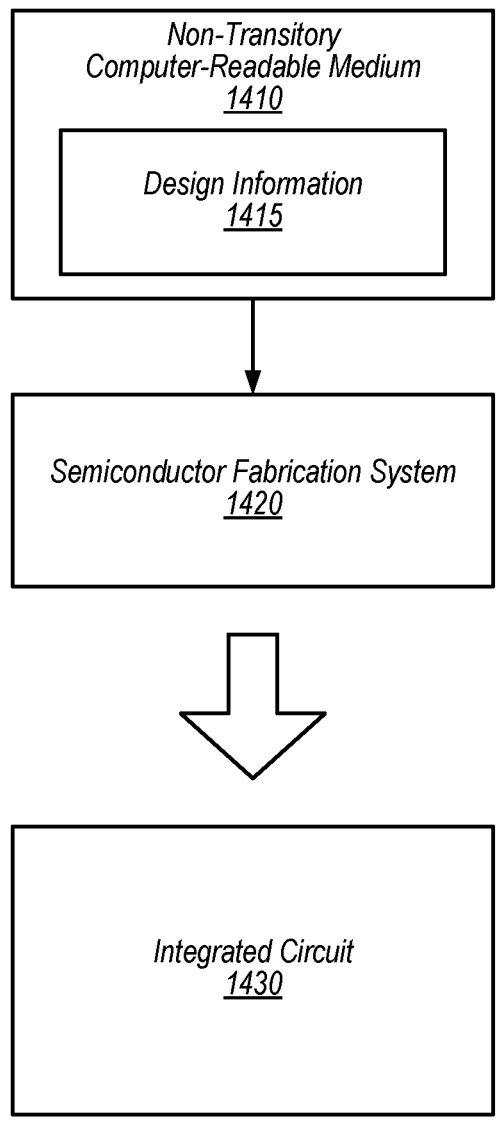
FIG. 14 is a block diagram illustrating an example process of fabricating at least a portion of an SOC, according to some embodiments.

Turning now to FIG. 14, a block diagram illustrating an example process of fabricating an integrated circuit 1430 that can include at least a portion of SOC 100 (or SOC 900) is shown. The illustrated embodiment includes a non-transitory computer-readable medium 1410 (which includes design information 1415), a semiconductor fabrication system 1420, and a resulting fabricated integrated circuit 1430. In some embodiments, integrated circuit 1430 includes at least a caching agent 110, a memory controller 120, a memory 130, and an I/O cluster 140—in some cases, that memory 130 and one or more peripherals 144 of that I/O cluster 140 may be separate from integrated circuit 1430. Integrated circuit 1430 may further additionally or alternatively includes other circuits such as a wireless network circuit. In the illustrated embodiment, semiconductor fabrication system 1420 is configured to process design information 1415 to fabricate integrated circuit 1430.

Non-transitory computer-readable medium 1410 may include any of various appropriate types of memory devices or storage devices. For example, non-transitory computer-readable medium 1410 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 1410 may include two or more memory mediums, which may reside in different locations (e.g., in different computer systems that are connected over a network).

Design information 1415 may be specified using any of various appropriate computer languages, including hardware description languages such as, without limitation: VHDL, Verilog, SystemC, System Verilog, RHDL, M, MyHDL, etc. Design information 1415 may be usable by semiconductor fabrication system 1420 to fabricate at least a portion of integrated circuit 1430. The format of design information 1415 may be recognized by at least one semiconductor fabrication system 1420. In some embodiments, design information 1415 may also include one or more cell libraries, which specify the synthesis and/or layout of integrated circuit 1430. In some embodiments, the design information is specified in whole or in part in the form of a netlist that specifies cell library elements and their connectivity. Design information 1415, taken alone, may or may not include sufficient information for fabrication of a corresponding integrated circuit (e.g., integrated circuit 1430). For example, design information 1415 may specify circuit elements to be fabricated but not their physical layout. In this case, design information 1415 may be combined with layout information to fabricate the specified integrated circuit.

Semiconductor fabrication system 1420 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1420 may also be configured to perform various testing of fabricated circuits for correct operation.

In various embodiments, integrated circuit 1430 is configured to operate according to a circuit design specified by design information 1415, which may include performing any of the functionality described herein. For example, integrated circuit 1430 may include any of various elements described with reference to FIGS. 1-13. Furthermore, integrated circuit 1430 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 1430 is performed. Design information 1415 may be generated using one or more computer systems and stored in non-transitory computer-readable medium 1410. The method may conclude when design information 1415 is sent to semiconductor fabrication system 1420 or prior to design information 1415 being sent to semiconductor fabrication system 1420. Accordingly, in some embodiments, the method may not include actions performed by semiconductor fabrication system 1420. Design information 1415 may be sent to semiconductor fabrication system 1420 in a variety of ways. For example, design information 1415 may be transmitted (e.g., via a transmission medium such as the Internet) from non-transitory computer-readable medium 1410 to semiconductor fabrication system 1420 (e.g., directly or indirectly). As another example, non-transitory computer-readable medium 1410 may be sent to semiconductor fabrication system 1420. In response to the method of initiating fabrication, semiconductor fabrication system 1420 may fabricate integrated circuit 1430 as discussed above.

Figure 15:
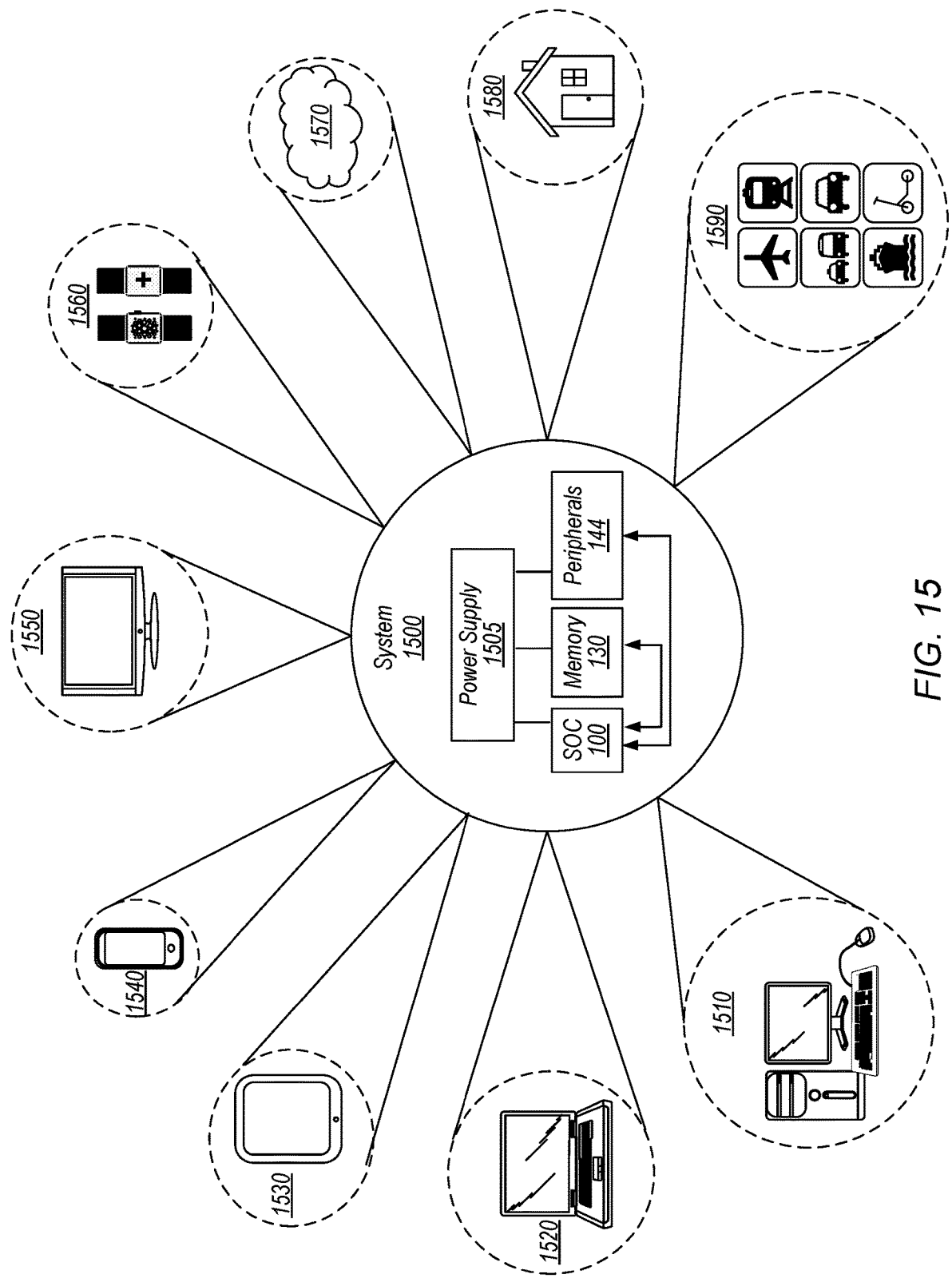
FIG. 15 is a block diagram illustrating an example SOC that is usable in various types of systems, according to some embodiments.

Turning next to FIG. 15, a block diagram of one embodiment of a system 1500 is shown that may incorporate and/or otherwise utilize the methods and mechanisms described herein. In the illustrated embodiment, the system 1500 includes at least one instance of a system on chip (SOC) 100 that is coupled to external memory 130, peripherals 144, and a power supply 1505. Power supply 1505 is also provided which supplies the supply voltages to SOC 100 as well as one or more supply voltages to the memory 130 and/or the peripherals 144. In various embodiments, power supply 1505 represents a battery (e.g., a rechargeable battery in a smart phone, laptop or tablet computer, or other device). In some embodiments, more than one instance of SOC 100 is included (and more than one external memory 130 is included as well).

As illustrated, system 1500 is shown to have application in a wide range of areas. For example, system 1500 may be utilized as part of the chips, circuitry, components, etc., of a desktop computer 1510, laptop computer 1520, tablet computer 1530, cellular or mobile phone 1540, or television 1550 (or set-top box coupled to a television). Also illustrated is a smartwatch and health monitoring device 1560. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1500 may further be used as part of a cloud-based service(s) 1570. For example, the previously mentioned devices, and/or other devices, may access computing resources in the cloud (e.g., remotely located hardware and/or software resources). Still further, system 1500 may be utilized in one or more devices of a home 1580 other than those previously mentioned. For example, appliances within home 1580 may monitor and detect conditions that warrant attention. For example, various devices within home 1580 (e.g., a refrigerator, a cooling system, etc.) may monitor the status of the device and provide an alert to the homeowner (or, for example, a repair facility) should a particular event be detected. Alternatively, a thermostat may monitor the temperature in home 1580 and may automate adjustments to a heating/cooling system based on a history of responses to various conditions by the homeowner. Also illustrated in FIG. 15 is the application of system 1500 to various modes of transportation 1590. For example, system 1500 may be used in the control and/or entertainment systems of aircraft, trains, buses, cars for hire, private automobiles, waterborne vessels from private boats to cruise liners, scooters (for rent or owned), and so on. In various cases, system 1500 may be used to provide automated guidance (e.g., self-driving vehicles), general systems control, and otherwise. These any many other embodiments are possible and are contemplated. It is noted that the devices and applications illustrated in FIG. 15 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a system on a chip (SOC), wherein the SOC includes:
an input/output (I/O) agent circuit that includes a memory bank and is configured to couple to a set of devices external to the SOC, wherein the I/O agent circuit is configured to:
assign a device of the set of devices to a subdomain of a plurality of subdomains implemented for the memory bank so that transactions of the device are stored in the memory bank in association with the subdomain assigned to the device;
store, in the memory bank, a set of transactions of the device in association with the subdomain assigned to the device; and
execute the set of transactions so that transactions stored in the memory bank in association with other ones of the plurality of subdomains than the subdomain assigned to the device do not block execution of the set of transactions.

2. The apparatus of claim 1, further comprising:
a second I/O agent circuit that includes a second memory bank and is coupled to a second set of devices, wherein the second I/O agent circuit is configured to store, in the second memory bank, transactions of the second set of devices in association with a single domain implemented for the second memory bank.

3. The apparatus of claim 1, wherein the I/O agent circuit is configured to store transactions of different virtual channels in association with a same subdomain in the memory bank.

4. The apparatus of claim 1, wherein the device is associated with an interface that includes an interface identifier that is used to identify the device, and wherein to assign the device to the subdomain, the I/O agent circuit is configured to assign the interface identifier to the subdomain.

5. The apparatus of claim 1, further comprising:
a set of caching agents; and
a memory management circuit coupled to the I/O agent circuit and configured to maintain memory coherency among the set of caching agents, wherein the memory management circuit is configured to manage the memory bank as a single caching agent for the set of devices.

6. The apparatus of claim 1, wherein the I/O agent circuit is configured to assign another device of the set of devices to the subdomain.

7. The apparatus of claim 1, wherein the I/O agent circuit is configured to:
receive an indication of a bandwidth associated with the set of devices; and
set a number of subdomains in the plurality of subdomains based on the bandwidth.

8. The apparatus of claim 1, wherein the I/O agent circuit is configured to set a number of subdomains in the plurality of subdomains during initialization of the I/O agent circuit.

9. The apparatus of claim 1, wherein the I/O agent circuit is configured to:
receive a request to adjust a number of subdomains in the plurality of subdomains to a new number of subdomains;
drain the memory bank of transactions; and
set the memory bank to support the new number of subdomains.

10. The apparatus of claim 1, wherein the I/O agent circuit is configured to:
execute transactions of a given subdomain of the plurality of subdomains in accordance with a set of ordering rules for that given subdomain.

11. The apparatus of claim 1, wherein the I/O agent circuit is configured to:
store, in the memory bank, a plurality of different types of transactions of the device in association with the subdomain and different virtual channels, wherein a transaction of a first one of the different virtual channels does not block progress of a transaction of a second one of the different virtual channels.

12. The apparatus of claim 1, wherein the I/O agent circuit is configured to:
assign an additional device of the set of devices to the subdomain based on a detection that the additional device and the device share an interface configured to transmit communications from the additional device and the device to the I/O agent circuit.

13. The apparatus of claim 1, wherein a number of subdomains in the plurality of subdomains is less than a number of devices in the set of devices.

14. A method, comprising:
receiving, by an input/output (I/O) agent circuit of a system, requests from devices that are coupled to the I/O agent circuit, wherein the requests include a request from a first device to perform a first transaction and a request from a second device to perform a second transaction;

receiving, by the I/O agent circuit, an indication of a bandwidth associated with the devices;

storing, by the I/O agent circuit and in a same memory bank of the I/O agent circuit, the first transaction in association with a first subdomain of a plurality of subdomains and the second transaction in association with a second subdomain of the plurality of subdomains, wherein the first subdomain is assigned to the first device and the second subdomain is assigned to the second device, wherein a number of subdomains in the plurality of subdomains is set based on the bandwidth; and executing, by the I/O agent circuit, the first transaction so that transactions, including the second transaction, of the second subdomain do not block execution of the first transaction.

15. The method of claim 14, further comprising:

assigning, by the I/O agent circuit, the first device to the first subdomain by configuring a set of registers with an interface identifier used on an interface to which the I/O agent circuit is coupled to identify the first device.

16. The method of claim 14, wherein at least two transactions that are part of different virtual channels are stored in the memory bank in association with the first subdomain.

17. The method of claim 16, wherein the at least two transactions are received from the first device.

18. A system, comprising:

a global communication fabric that includes multiple independent networks having different communication and coherency protocols;

a plurality of input-output (I/O) clusters that includes different sets of local functional circuits, wherein a given I/O cluster is coupled to one or more of the independent networks of the global communication fabric and includes:

a set of local functional circuits;

a local bus coupled to the set of local functional circuits; and an input/output (I/O) agent circuit that is coupled to the local bus and configured to bridge transactions between the set of local functional circuits and the global communication fabric, wherein the I/O agent circuit includes a memory bank and is further configured to:

receive requests from the set of local functional circuits to perform a set of transactions;

store, in the memory bank, at least two transactions of the set of transactions that are associated with different virtual channels in a same subdomain of a plurality of subdomains implemented for the memory bank and at least two transactions of the set of transactions that are associated with different local functional circuits in different subdomains of the plurality of subdomains; and execute the set of transactions so that transactions stored in association with a first subdomain of the plurality of subdomains do not block execution of transactions stored in association with a second subdomain of the plurality of subdomains.

19. The system of claim 18, wherein the I/O agent circuit is configured to:

store, in the memory bank, at least two transactions of the set of transactions that are associated with different local functional circuits in a same subdomain of the plurality of subdomains.

20. The system of claim 18, wherein the system further comprises:

a set of caching agents; and a memory management circuit coupled to the I/O agent circuit and configured to maintain memory coherency among the set of caching agents, wherein the memory management circuit is configured to manage the memory bank as a single caching agent for the set of local functional circuits.

21. The system of claim 18, wherein the system further comprises:

a second I/O agent circuit that includes a second memory bank and is coupled to a second set of local functional circuits, wherein the second I/O agent circuit is configured to store, in the second memory bank, transactions of the second set of local functional circuits in association with a single domain implemented for the second memory bank.

22. The system of claim 18, wherein the I/O agent circuit is configured to:

execute the transactions stored in association with the first subdomain according to a set of ordering rules that define an ordering in which the transactions of the first subdomain are to be executed.

23. An apparatus, comprising:

an input/output (I/O) agent circuit that includes a memory bank and is coupled to a set of devices, wherein the I/O agent circuit is configured to:

assign a device of the set of devices to a subdomain of a plurality of subdomains implemented for the memory bank;

store, in the memory bank, a set of transactions of the device in association with the subdomain assigned to the device; and execute the set of transactions so that transactions stored in the memory bank in association with other ones of the plurality of subdomains than the subdomain assigned to the device do not block execution of the set of transactions;

a set of caching agents; and a memory management circuit coupled to the I/O agent circuit and configured to maintain memory coherency among the set of caching agents, wherein the memory management circuit is configured to manage the memory bank as a single caching agent for the set of devices.

* * * * *